(12) United States Patent
Missout

(10) Patent No.: US 11,286,194 B2
(45) Date of Patent: Mar. 29, 2022

(54) SELF-REPLICATING FUSED DEPOSITION MODELING PRINTER USING GRANULES

(71) Applicant: Metakine Inc., Sutton (CA)

(72) Inventor: Antoine Missout, Sutton (CA)

(73) Assignee: Kilncore Inc., Sutton (CA)

( * ) Notice: Subject to any disclaimer, the term of this patent is extended or adjusted under 35 U.S.C. 154(b) by 0 days.

(21) Appl. No.: 16/973,940

(22) PCT Filed: Jun. 19, 2019

(86) PCT No.: PCT/CA2019/050861
§ 371 (c)(1),
(2) Date: Dec. 10, 2020

(87) PCT Pub. No.: WO2019/241886
PCT Pub. Date: Dec. 26, 2019

(65) Prior Publication Data
US 2021/0371322 A1 Dec. 2, 2021

Related U.S. Application Data

(60) Provisional application No. 62/686,914, filed on Jun. 19, 2018.

(51) Int. Cl.
| | | |
|---|---|---|
| *C03B 19/01* | (2006.01) | |
| *B33Y 30/00* | (2015.01) | |
| *B33Y 40/00* | (2020.01) | |
| *B33Y 50/02* | (2015.01) | |

(52) U.S. Cl.
CPC ............. *C03B 19/01* (2013.01); *B33Y 30/00* (2014.12); *B33Y 40/00* (2014.12); *B33Y 50/02* (2014.12)

(58) Field of Classification Search
CPC ......... C03B 19/01; B33Y 30/00; B33Y 40/00; B33Y 50/02
See application file for complete search history.

(56) References Cited

U.S. PATENT DOCUMENTS

| | | |
|---|---|---|
| 4,983,198 A | 1/1991 | Ogino |
| 5,121,329 A | 6/1992 | Crump |
| 5,364,432 A | 11/1994 | Leber |
| 5,402,351 A | 3/1995 | Batchelder |
| 6,264,850 B1 | 7/2001 | Silverbrook |
| 6,722,872 B1 | 4/2004 | Swanson |

(Continued)

FOREIGN PATENT DOCUMENTS

| | | |
|---|---|---|
| CN | 203419844 | 2/2014 |
| CN | 105731769 | 7/2016 |

(Continued)

*Primary Examiner* — Joseph S Del Sole
*Assistant Examiner* — Jamel M Nelson
(74) *Attorney, Agent, or Firm* — Benoit & Cote Inc.

(57) ABSTRACT

A material delivery device for an additive manufacturing device (AMD) adapted for manufacturing objects through deposition of additive material over a build surface. The material delivery device comprises an inner funnel having a large aperture and a small aperture whereby the additive material is guided from the large aperture to the small aperture; wherein the inner funnel is electrically conductive and, upon applying an electrical current to the inner funnel, heat is generated thereby heating the additive material travelling in the inner funnel.

6 Claims, 22 Drawing Sheets

(56) References Cited

U.S. PATENT DOCUMENTS

| | | |
|---|---|---|
| 6,915,636 B2 | 7/2005 | Stuttaford et al. |
| 9,022,769 B2 | 5/2015 | Swanson |
| 9,815,243 B2 | 11/2017 | Hartmann |
| 9,914,169 B2 | 3/2018 | Ederer et al. |
| 9,919,360 B2 | 3/2018 | Buller |
| 2004/0055339 A1 | 3/2004 | Ishihara |
| 2005/0110200 A1 | 5/2005 | Fong |
| 2008/0213149 A1 | 9/2008 | Gauthier |
| 2011/0100576 A1 | 5/2011 | Ogiwara |
| 2015/0307385 A1 | 10/2015 | Klein et al. |
| 2016/0194233 A1 | 7/2016 | Van Pelt |
| 2017/0144328 A1 | 5/2017 | Kramer et al. |
| 2017/0291841 A1 | 10/2017 | Inamura |
| 2018/0075741 A1 | 5/2018 | Bidner et al. |
| 2018/0117836 A1 | 5/2018 | Reese et al. |
| 2018/0147670 A1 | 5/2018 | Wiggins |
| 2018/0229433 A1* | 8/2018 | Lan ........................ B33Y 30/00 |
| 2018/0290381 A1 | 10/2018 | Volkov |
| 2019/0074955 A1 | 3/2019 | Shimomura |

FOREIGN PATENT DOCUMENTS

| | | |
|---|---|---|
| CN | 105984142 | 10/2016 |
| CN | 106313501 | 1/2017 |
| CN | 206106378 | 4/2017 |
| CN | 107225753 | 10/2017 |
| CN | 107856294 | 3/2018 |
| CN | 107225753 B * | 6/2019 |
| WO | 2011100576 | 8/2011 |
| WO | 2016094329 | 6/2016 |
| WO | 2016196382 | 12/2016 |
| WO | 2017071388 | 5/2017 |
| WO | 2017100695 | 6/2017 |
| WO | 2018005439 | 1/2018 |
| WO | 2018026909 | 2/2018 |
| WO | 2018075741 | 4/2018 |
| WO | 2019074955 | 4/2019 |

* cited by examiner ical application 62/686,914 filed Jun. 19, 2018, the speci-
SELF-REPLICATING FUSED DEPOSITION MODELING PRINTER USING GRANULES

CROSS-REFERENCE TO RELATED APPLICATION

This application claims priority from U.S. provisional patent application 62/686,914 filed Jun. 19, 2018, the specification of which is hereby incorporated herein by reference in its entirety.

BACKGROUND

(a) Field

The subject matter disclosed generally relates to 3D manufacturing tools, and tools adapted to perform additive manufacturing processes through deposition of additive materials. More particularly, the subject matter disclosed relates to 3D printers or other types of additive manufacturing devices.

(b) Related Prior Art

Existing conventional 3D printers are specialized pieces of equipment that are making their way into the mainstream market. It is currently possible to buy parts to build your own 3D machine, which requires time and knowledge. On the other hand, one can also buy an assembled 3D printing machine that is ready to use. In both cases, in order to build and assemble or repair the 3D printing machine, multiple mechanical parts have to be bought from multiple companies, which increases the cost, complexity and time required for assembling a 3D printing machine while decreases the desire of owners of 3D printing machines to maintain spare parts to respond to wear and tear.

One supplier, www.RepRap.org, has tried to overcome these shortcomings by designing a general-purpose self-replicating 3D printing machine. However, since the RepRap 3D printer is only capable of producing plastic-made parts, the opportunities provided by the RepRap machine are relatively limited.

Furthermore, 3D printers are nowadays being actively developed by many other companies and individuals with the object of either trying to make an ever-cheaper 3D printer or a more reliable plastic filament printer, which has a major drawback in the cost of the printing material: plastic beads for 3D printers are expensive, at least about 30$/kg. Alternatively, others develop 3D metal printers with which people shine lasers at expensive metals. Another alternative is using resin as printing material, which, as plastic beads, is also expensive.

Accordingly, the present subject-matter aims to at least partly address these shortcomings.

SUMMARY

According to an embodiment, there is provided an additive manufacturing device (AMD) for manufacturing objects through deposition of additive material over a build surface, the AMD comprising: an electric power source; a material feeding conduit comprising an inner tube, wherein the material feeding conduit feeds the inner tube with the additive material and the inner tube is electrically connected to the electric power source; and a material delivery device is in electrical and mechanical contact with the material feeding conduit, the material delivery device comprising an inner funnel having a large aperture and a small aperture whereby the additive material is guided from the large aperture to the small aperture; wherein the inner funnel is electrically conductive and, upon applying an electrical current to the inner funnel, heat is generated thereby heating the additive material travelling in the inner funnel.

According to an aspect, the inner tube is in electrical and mechanical contact with the large aperture of the inner funnel.

According to an aspect, the material delivery device further comprises an outer funnel located external to the inner funnel, the outer funnel having a small aperture, wherein the outer funnel is joined to the inner funnel about the small aperture of the inner funnel and the small aperture of the outer funnel.

According to an aspect, the outer funnel further comprises a large aperture and the material feeding conduit comprises an outer tube, and further wherein the outer tube is in electrical and mechanical contact with the large aperture of the outer funnel.

According to an aspect, the AMD further comprises a junction wall extending about the small aperture of the inner funnel, whereby the junction wall joins the outer funnel to the inner funnel.

According to an aspect, the junction wall divides an interior space concealed by the inner funnel and an exterior space within the outer funnel, wherein the wall comprises slits through which the exterior space is in fluid communication with the interior space.

According to an aspect, the AMD further comprises a flow-driving means fluidly connected to the outer tube, wherein the flow-driving means is adapted to transmit gas waves to the additive material about the small aperture of the inner funnel through the slits.

According to an aspect, the flow-driving means is a subwoofer speaker.

According to an aspect, the flow-driving means is an air compressor.

According to an aspect, the slits have dimensions and wherein the dimensions of the slits: allow gas from the exterior space into the interior space; and prevent the additive material from travelling from the interior space into the exterior space.

According to an aspect, the AMD further comprises: a sensor reading one of: temperature in the material delivery device; flow of additive material in the material delivery device; and a physical characteristic of the material delivery device changing with the temperature of the material delivery device, and a power controller electrically connected electric power source, wherein the power controller is adapted to modify the electrical power transmitted to the electrical power source based on readings from the sensor.

According to an aspect, the AMD further comprises an optical sensor monitoring flow of the additive material in one of: upstream from the material feeding conduit; in the material feeding conduit; and downstream from the material feeding conduit.

According to an aspect, the material feeding conduit comprises an outer tube, and wherein the material delivery device is made of a first material capable of resisting to a top temperature, and wherein one of the inner tube and the outer tube is made of a second material capable of resisting to a second temperature, wherein the second temperature is below the top temperature, and wherein the first material is different from the second material.

According to an aspect, the material delivery device is adapted to heat the additive material from a solid state into a fluid state, and wherein the material delivery device deposits the additive material in the fluid state to the build surface upon its exit from the small aperture of the inner funnel.

According to an embodiment, there is provided a material delivery device for an additive manufacturing device (AMD) adapted for manufacturing objects through deposition of additive material over a build surface, the material delivery device comprising: an inner funnel having a large aperture and a small aperture whereby the additive material is guided from the large aperture to the small aperture; wherein the inner funnel is electrically conductive and, upon applying an electrical current to the inner funnel, heat is generated thereby heating the additive material travelling in the inner funnel.

According to an aspect, the material delivery device further comprises an outer funnel located external to the inner funnel, the outer funnel having a small aperture, wherein the outer funnel is joined to the inner funnel about the small aperture of the inner funnel and the small aperture of the outer funnel.

According to an aspect, the material delivery device further comprises a junction wall extending about the small aperture of the inner funnel, whereby the junction wall joins the outer funnel to the inner funnel.

According to an aspect, the junction wall divides an interior space concealed by the inner funnel and an exterior space within the outer funnel, wherein the wall comprises slits through which the exterior space is in fluid communication with the interior space.

According to an aspect, the material delivery device is made at least in part of one of a metallic material or a metallic alloy.

According to an aspect, the material delivery device is made at least in part of one of platinum and a platinum-based alloy.

According to an aspect, the inner funnel has a varying thickness which results in a variation of an electrical resistance of the inner funnel and hence a variation of the heat which is generated.

According to an embodiment, there is provided an additive manufacturing device (AMD) for manufacturing objects through deposition of additive material over a build surface, the AMD comprising: an electric power source; a material feeding conduit comprising an inner tube, wherein the material feeding conduit feeds the inner tube with the additive material; and a crucible/nozzle combination (C/NC) connected to the electric power source and the material feeding conduit, the C/NC comprising: an inner funnel comprising a top edge, a bottom edge, a top perimeter about the top edge, a bottom perimeter about the bottom edge, with the top perimeter being greater than the bottom perimeter, and an aperture at the bottom edge operating as a nozzle; a rim extending outwardly from the bottom edge; a first electrical contact located about the top edge of the inner funnel and electrically connected to the electric power source through the material feeding conduit; and a second electrical contact located on the rim distant from the inner funnel and electrically connected to the electric power source; wherein the inner funnel is adapted to receive at the top edge the additive material from the material feeding conduit, to guide the additive material travelling from the top edge to the nozzle, and to heat the additive material therebetween, wherein the C/NC is adapted to heat as current travels between the first electrical contact and the second electrical contact, thereby heating the additive material travelling in the inner funnel, and wherein the additive material flows out of the C/NC through the nozzle to be deposited to the build surface.

According to an embodiment, there is provided a crucible/nozzle combination (C/NC) for an additive manufacturing device (AMD) adapted for manufacturing objects through deposition of additive material over a build surface, the crucible/nozzle combination comprising: an inner funnel comprising a top edge, a bottom edge, a top flow area about the top edge, a bottom flow area about the bottom edge, with the top flow area being greater than the bottom flow area, and an aperture at the bottom edge operating as a nozzle; a rim extending outwardly from the bottom edge of the inner funnel; a first electrical contact located about the top edge of the inner funnel; and a second electrical contact located on the rim distant from the inner funnel; wherein the inner funnel is adapted to receive the additive material from its top edge, to guide the additive material travelling from its top edge to its nozzle, and to heat the additive material therebetween, and wherein the C/NC is adapted to heat as current travels between the first electrical contact and the second electrical contact, thereby heating the additive material travelling in the inner funnel.

According to an embodiment, there is provided a 3D printer for printing 3D objects in a heated chamber comprising a build surface, the 3D printer comprising: a feeding assembly; and a printer block receiving printing material from the feeding assembly, the printer block comprising: a first micro-kiln heating the printing material to a melted condition; and a second micro-kiln fluidly connected to the first micro-kiln and receiving the melted material from the first micro-kiln, the second micro-kiln comprising: a heating component heating the printing material contained in the second micro-kiln to a melted form; a cooling component cooling off the printing material contained in the second micro-kiln to a solid form; and a nozzle fluidly connected to the second micro-kiln, and guiding flow of melted printing material on the build surface to print the 3D object from printing material.

According to an embodiment, there is provided a feeding system for queueing granules of printing material, the feeding system comprising: an audio amplifier generating audio signals; a speaker comprising a diaphragm, the speaker receiving audio signals from the amplifier with the diaphragm moving accordingly; and an acoustic feeder attached to the diaphragm, the acoustic feeder comprising a receiving area and a feeding hole distant from the receiving area, wherein the receiving area receives the granules which move towards the feeding hole under movements forced by the diaphragm over the acoustic feeder; wherein the feeding system takes raw materials and orders them in a queue.

According to an embodiment, there is provided an optical sorter for sorting printing material, the optical sorter comprising: a controller receiving signals and generating command signals; an audio amplifier generating audio signals based on command signals received from the controller; horn comprising an upstream extremity and an output hole facing a sorting area where granules are falling, wherein the output hole is distant from the upstream extremity; a speaker mounted to the upstream extremity of the horn, the speaker comprising a diaphragm generating waves in the horn based on audio signals received from the amplifier, wherein the waves are amplified by the horn and are exiting the horn though the output hole; an optical sensor detecting granules falling towards the sorting area and transmitting signals to the controller accordingly; and sorting bins located about the sorting area, the sorting bins receiving sorted granules, wherein the optical sensor is configured to generate signals that will produce acoustic waves that push the granules as they pass in the sorting area towards the corresponding sorting bin according to the signals generated by the optical sensor.

According to an embodiment, there is provided a 3D printer for printing 3D objects with a variety of printing materials comprising at least glass, the 3D printer comprising: a feeding assembly; and a micro-kiln receiving printing material from the feeding assembly, the micro-kiln comprising: a heating component heating the printing material at a temperature set based on nature of the printing material to a melted form; a cooling component cooling off the printing material at a temperature set based on nature of the printing material to a solid form; a nozzle guiding flow of melted printing material to print the 3D object from printing material; and a heated chamber comprising a building surface receiving the melted printing material flowing out of the nozzle for printing the 3D objected thereon.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
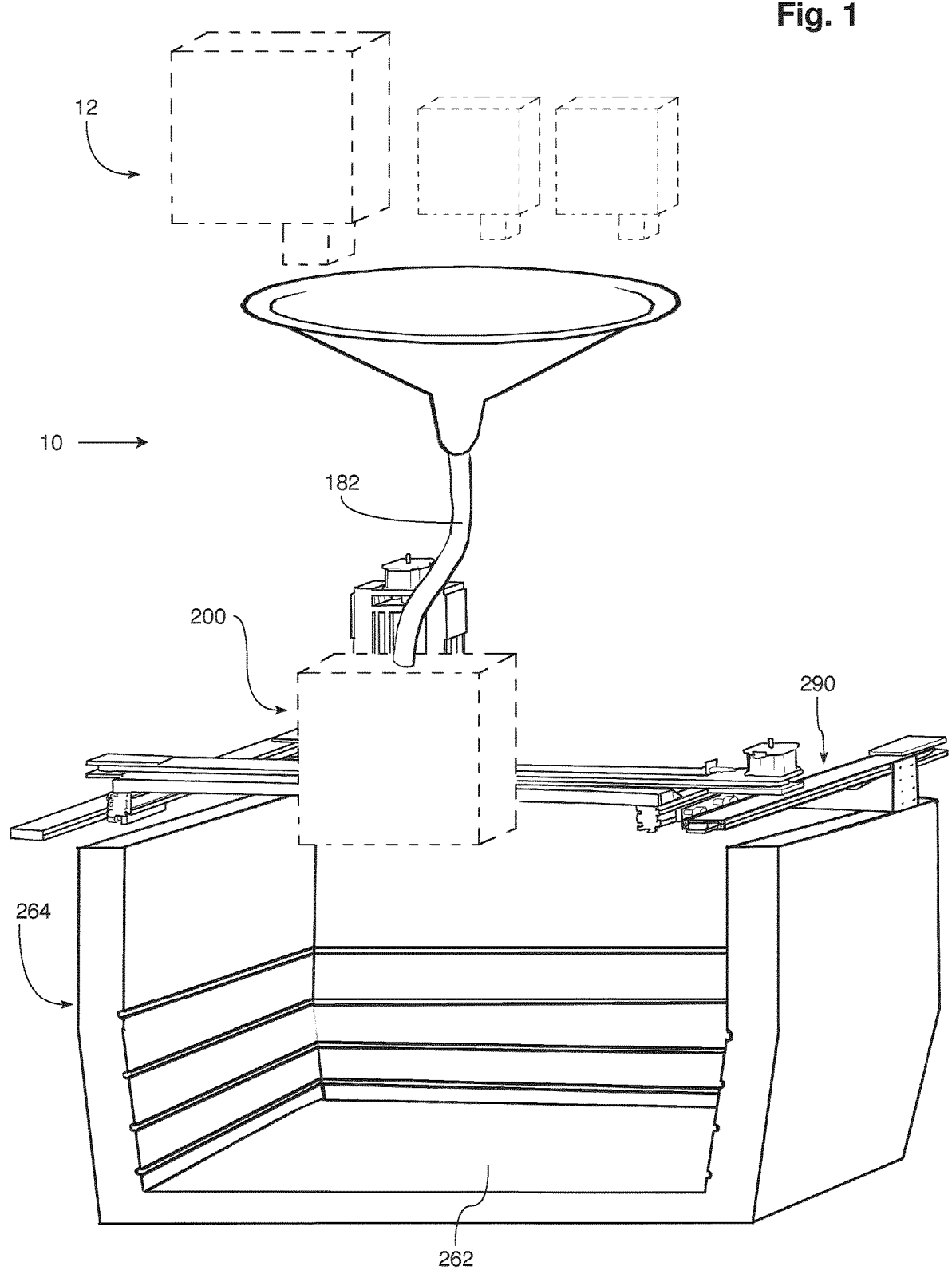
FIG. 1 is a schematic view of a 3D printer in accordance with an embodiment.

Nowadays, recycled glass is a widely available and low-cost material. So, in light of the text by John Klein from MIT: http://web.media.mit.edu/~neri/MATTER.MEDIA/Theses/John_Klein_MIT_MSc_Thesis_Submission%20(1).pdf, it becomes apparent that there is an opportunity to decrease the cost of operating a 3D printer by both designing a 3D printer capable of manufacturing its own replacement parts; and being able to use a variety of printing materials, including recycled glass material which is widely available at low costs.

Recycled glass is basically considered garbage these days; recycled glass is currently sold for instance as abrasive, pool filter material, or additive/ingredient for concrete products. Recycled glass can currently be bought in bulk, with a fixed granule size, for less than 0.50$/kg, and in some cases at even lower prices considering that some cities are spending money to get rid of their recycled glass rather than selling it.

Accordingly, the 3D printer, aka Additive Manufacturing device or AMD, described herein takes advantage of the present situation by using widely available recycled glass as a printing material. Nevertheless, alternative printing materials are considered with respect with the 3D printer of the subject-matter, such as a variety of materials available in powder or granule formats. Using one such alternative printing materials is intended to require simple adjustments to the 3D printer described herein. Alternative printing material suitable for the present 3D printer comprises sugar, PLA granules, ABS granules, PETG granules, metal, sand, Martian regolith, etc. Requirements for these materials comprise that a material is available to serve as a crucible to resist the temperatures associated with printing that printing material when molten.

With respect to the present description, references to "3D printer" should be understood to reference to a tool or device adapted to perform additive manufacturing processes through deposition of additive materials. Accordingly, the expression "3D printer" encompasses any device or subsystem of a tool adapted to perform such a process, regardless of the nature of the outcome of the process.

With respect to the present description, references to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values and of values herein or on the drawings are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described realizations. The use of any and all examples, or exemplary language ("e.g.," "such as," or the like) provided herein, is intended merely to better illuminate the exemplary realizations and does not pose a limitation on the scope of the realizations. No language in the specification should be construed as indicating any unclaimed element as essential to the practice of the realizations.

In the following description, it is understood that terms such as "first", "second", "top", "bottom", "above", "below", and the like, are words of convenience and are not to be construed as limiting terms.

The terms "top", "up", "upper", "bottom", "lower", "down", "vertical", "horizontal", "interior" and "exterior" and the like are intended to be construed in their normal meaning in relation with normal installation of the product.

Further, in the following description, the term "crucible" should be construed as "a vessel of a very refractory material used for melting and calcining a substance that requires a high degree of heat" (see Merriam-Webster Online Dictionary at https://www.merriam-webster.com/dictionary/).

Similarly, the term "nozzle" should be construed as "a short tube with a taper or constriction used (as on a hose) to speed up or direct a flow of fluid", or, according to Wikipedia (https://en.wikipedia.org/wiki/Nozzle), "a device designed to control the direction or characteristics of a fluid flow (especially to increase velocity) as it exits (or enters) an enclosed chamber or pipe". Thus, "nozzle" should be as commonly construed by person of the art as a type of outlet adapted for delivery of a fluid out of a constrained guided space in a controlled fashion.

Referring to the drawings in general, to efficiently describe the 3D printer 10 of the present subject-matter, the components of the 3D printer 10 are described following the path of the printing material, from raw material to the printed object.

Referring now to FIG. 1, the 3D printer 10 comprises a feeder block 12 using a flexible tube 182 to feed a printer block 200 with granules 90. The printer block 200 is adapted to melt the granules 90 and to lay down, aka to deposit, on a build surface of a kiln assembly 262, a flow of molted material. Positions in which the material is laid down are controlled by a Computer Numerical Control (CNC) machine 290, which moves the printer block 200 relative to the build surface of the kiln assembly 262; the latter being used as a heated chamber 264 to controllably cool down the molten material according to a desired rate. When all the material required to 3D print a piece is laid down on the build surface, the 3D piece is cooled down slowly.

Figure 2:
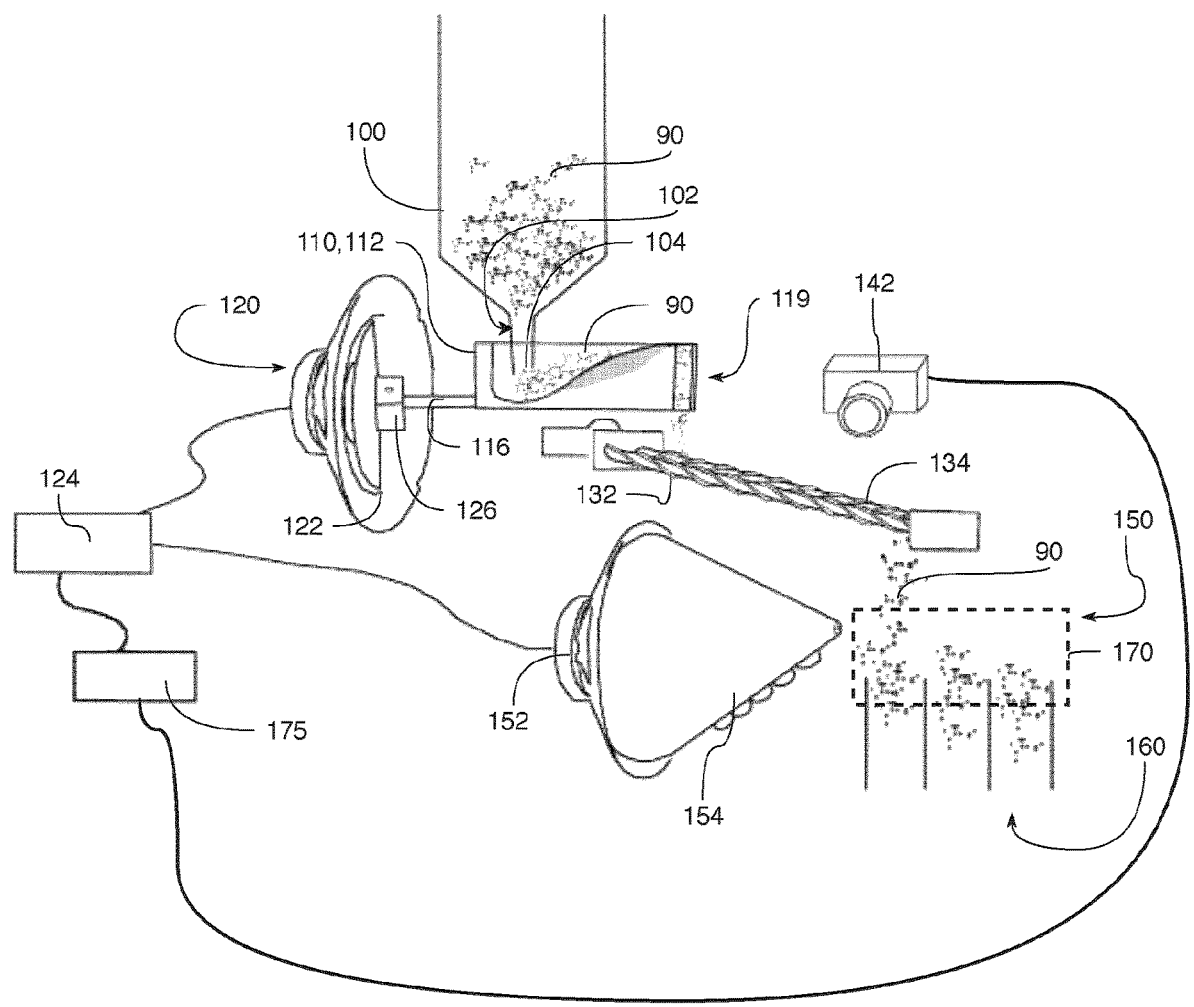
FIG. 2 is a schematic view of the components involved in the sorting process in accordance with an embodiment.

Referring now more particularly to FIG. 2, the feeder block 12 of FIG. 1 comprises a reservoir 100, located substantially at the top of the 3D printer 10 in which the printing material, e.g., the recycled glass beads, hereinafter called granules 90, are placed. The reservoir 100 ends at its base with a tube 102 having an open extremity 104 located inside a feeder 110, namely an acoustic feeder 112 (see FIG. 6). The open extremity 104 is located above the floor of the acoustic feeder 112.

One must note that the acoustic feeder 112, as most of the other parts, either specifically mentioned or not as such, is designed to be easily printed using the 3D printer 10.

The granules 90 are freely fed to the acoustic feeder 112, with the flow of granules 90 travelling from the reservoir 100 to the acoustic feeder 112 being controlled by the acoustic feeder 112 according to a pull process. More specifically, the acoustic feeder 112 controls the quantity of granules 90 and the movement of the granules 90, which controls the inflow of granules 90.

Movements of the acoustic feeder 112 are driven by a linear motor 120. According to an embodiment, a speaker such as a loudspeaker 122 is used as linear motor 120 to move the acoustic feeder 112. An audio amplifier 124 connected to the loudspeaker 122 controls the movements of the acoustic feeder 112 through the movement of the diaphragm 126 of the loudspeaker 122. By controlling the characteristics (e.g., volume, amplitude, frequency and shape) of the sound waves to be produces by the loudspeaker 122, desired movements are forced on the acoustic feeder 112 attached to the diaphragm 126 of the loudspeaker 122.

Figure 6:
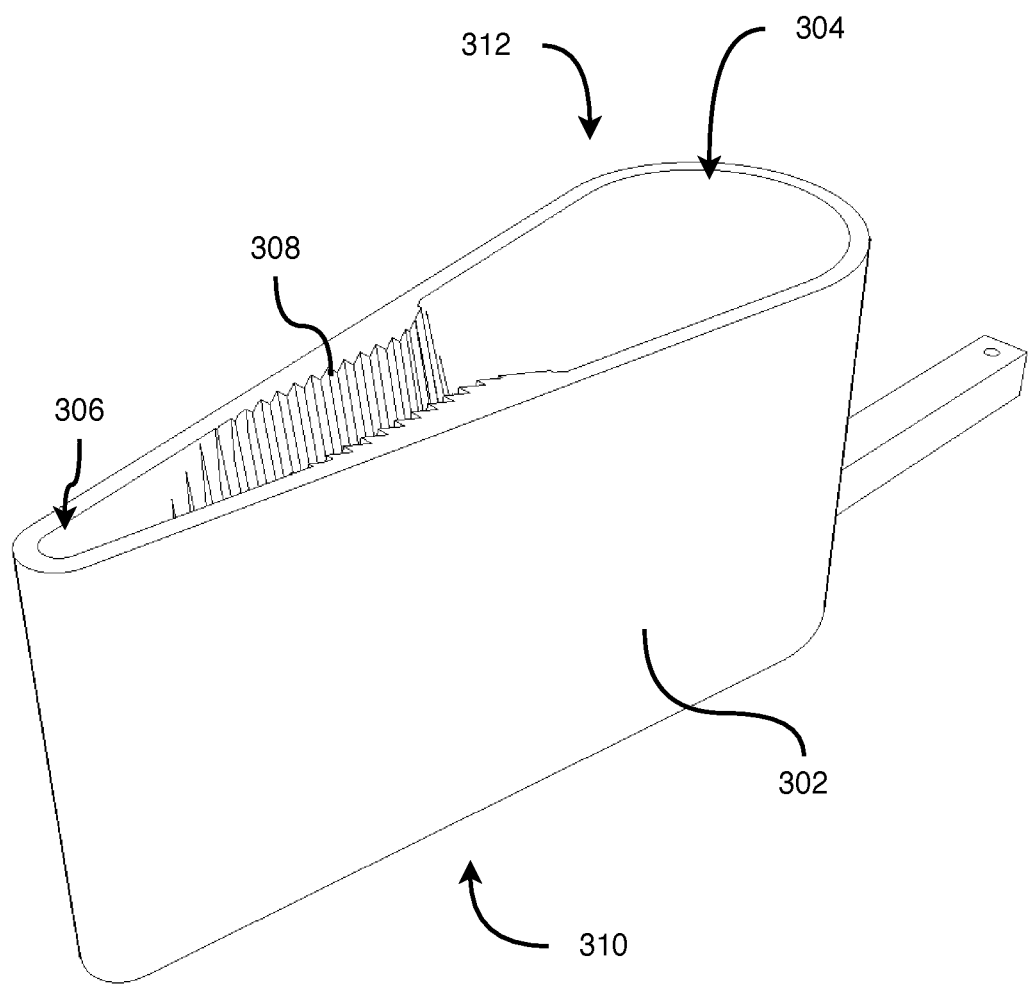
FIG. 6 is a perspective view of an acoustic feeder according to an embodiment.

Referring particularly to FIG. 6, the acoustic feeder 112 comprises a housing 302 comprising a receiving extremity 304 and a feeding extremity 306. The housing 302 from the receiving extremity 304 to the feeding extremity 306 has a generally funnel shape leading the granules 90 towards a queueing formation towards the feeding extremity 306. The walls 308 of the housing 302 are ribbed to provide resistance to the advancing movement of the granules 90. The floor 310 of the acoustic feeder 112 is also ribbed and further relatively raised from the receiving extremity 304 to the feeding extremity 306. At the feeding extremity 306, a feeding hole 312 allows the passage of a single granule at the time out of the acoustic feeder 112. Thus, the general shape of the acoustic feeder 112 and characteristics leads the granules 90 under movement forces by the linear motor 120 to a one-by-one passage of the granules 90 out of the acoustic feeder 112 through the feeding hole 312.

According to an embodiment, the configuration of the feeder 112 is less complex. The less complex feeder 112 comprises a floor 310 extending from a slope of about zero (0) degrees (thus horizontal) or slightly negative slope relative to the flow of granules, with the slope of the floor 310 increasing gradually to a significant slope (e.g. thirty (30) degrees) near the feeding hole 312. According to an embodiment depicted on FIG. 18, the feeder 112 features a channel 311 instead of a feeding hole 312.

Referring back to FIG. 2. advantages of loudspeakers 122 over other types of linear motors 120 resides in its cost and wide availability, as the ease of controlling the resulting movements forced by the loudspeaker 122 onto the acoustic feeder 112.

Figure 7:
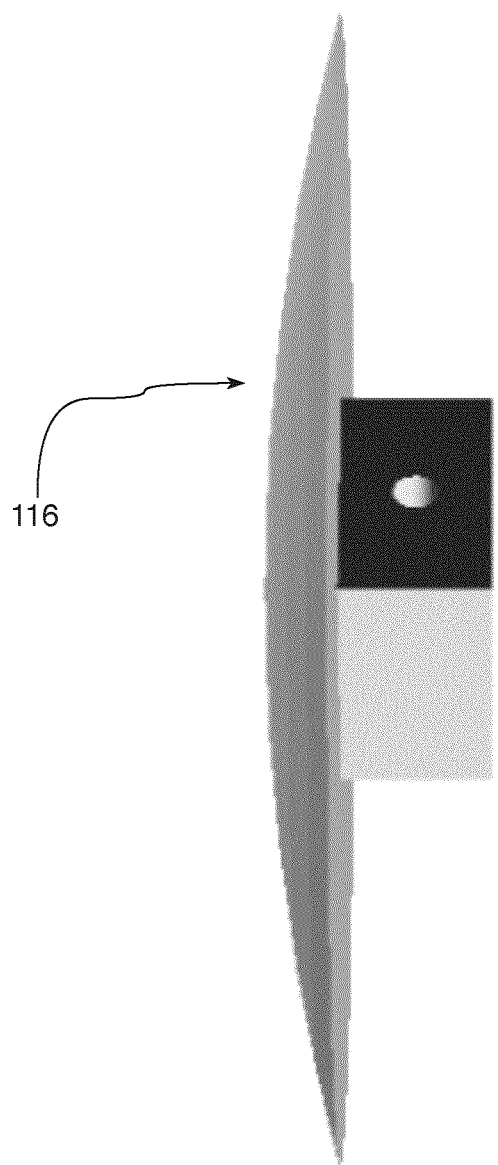
FIG. 7 is a side view of a speaker plug used to attach the acoustic feeder of FIG. 6 to a loudspeaker according to an embodiment.

For operation, the acoustic feeder 112 is attached to the loudspeaker 122 through a speaker plug 116, with the movement forced onto the acoustic feeder 112 following the axis of the speaker plug 116. When operating at appropriate parameters set according to the characteristics (e.g. size) of the granules 90, the movements of the acoustic feeder 112 results in the granules 90 moving towards the exit extremity 119 of the acoustic feeder 112 with the contact of the granules 90 over the walls and floor of the acoustic feeder 112 ordering the granules 90 in a queue formation. According to an embodiment, the acoustic feeder 112 is attached to the loudspeaker 122 using another 3D printed part. i.e., the speaker plug 116 (see FIG. 7), e.g., glued at one extremity to the acoustic feeder 112 and at the other extremity to the diaphragm 126 of the loudspeaker 122. By attaching the assembly in a slightly off-centered fashion with respect to the diaphragm 126, the profile of the acoustic/kinetic impulse forced on the acoustic feeder 112 may be slightly changed, in order to provide modifications in the vertical and/or horizontal components of the movements forced to the acoustic feeder 112.

Below the acoustic feeder 112, about the exit extremity 119, are two (2) infinite screws 132, 134 on which fall the granules 90. The two (2) infinite screws 132, 134 are spinning in opposite directions to slowly move the granules 90 at constant speed over a path along the length of the infinite screws 132, 134. Along their travel path, the granules 90 are scanned by optical sensors 142, detecting the characteristics of the granules 90 to sort them out. Accordingly, granules 90 are either selected or rejected for 3D printing. Reasons for which granules 90 are rejected can be, for example, that among the raw material are granules of ceramic, which are intended to be removed from the mix since they do not present the same characteristics. This sorting process removes the rejected granules from the raw material; thus, sorting the rejected granules and the granules 90 to be used for 3D printing.

Figure 18:
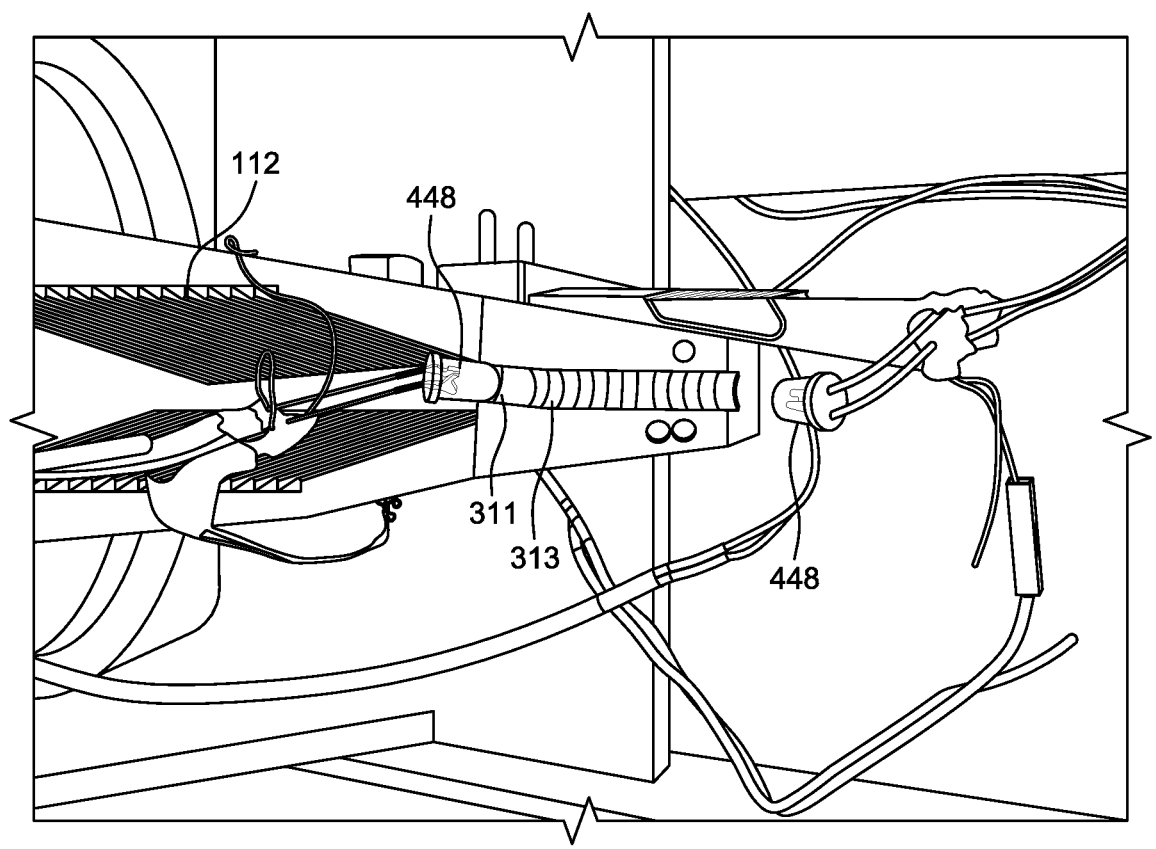
FIG. 18 is a top perspective view of a feeder of a 3D printer in accordance with an embodiment.

According to an embodiment depicted on FIG. 18, an optical sensor 448 is placed directly on the moving acoustic feeder 112, above the downward slope near the exit. The granules 90 are sensed optically, e.g., observed using a camera while lit by a light source in front a color-coded background 313. A condition for contrasts is therefore reached, that condition helping for classification of the granules 90.

According to embodiments, other components and alternative algorithms may be used to detect, sort, and identify characteristics of granules 90 without departing from the object of the present 3D printer 10.

According to an embodiment, a magnet (not shown) is mounted along the path of the granules 90 preceding the optical sensors 142. The magnet allows detecting the presence of metal in the raw material. The magnetic force produced by the magnet is used to remove the metallic material from the granules 90 when metallic material passes close to the magnet.

Configuration of the infinite screws 132, 134 further results in smaller size material (smaller than the nominal granule size), such as powder falling through the space between the infinite screws 132, 134 as the granules 90 are forced to travel via the infinite screws 132, 134, with the smaller size material being collected below.

Figure 8:
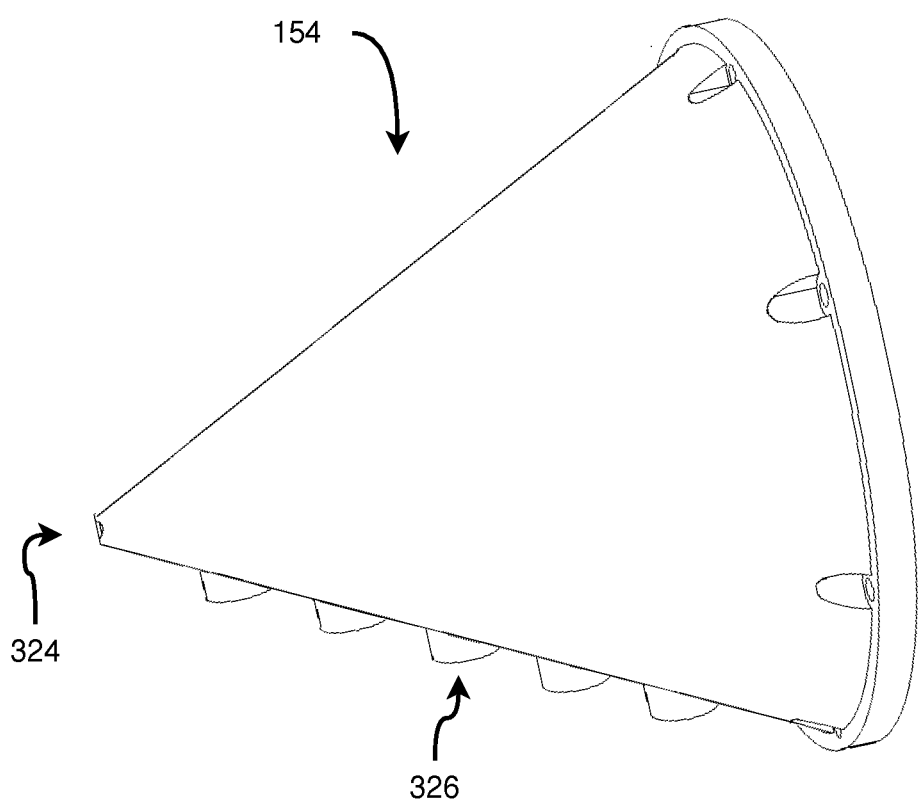
FIG. 8 is a perspective view of a horn used in the sorting granules according to an embodiment.

To sort the granules and thus reject unwanted material from the raw material and to obtain the desired quality of granules 90 in a low-cost fashion, an optical sorter 150 comprising a subwoofer loudspeaker 152 with a horn 154 (see FIG. 8) is used. The sorting process concentrates air waves towards the granules 90 falling in the sorting area 170 in front of the horn 154 and sends a sound pulse at the appropriate moment to push out material in the appropriate bin 160. When an inverse saw-tooth wave is sent by the audio amplifier 124 to the subwoofer loudspeaker 152, the shock wave is mostly sent to the output hole 324, while the slower return of the diaphragm 126 of the subwoofer loudspeaker 152 to its rest position can breathe through the extra holes 326. Using various amplitudes, the granules 90 are pushed into different bins 160 according to their size, thus sorting the granules 90.

A controller 175 (illustrated in two separate parts on FIG. 2) is connected to the audio amplifier 124 and to the optical sensors 142. The controller 175 controls the signals to be generated by the loudspeaker 122 and the subwoofer loudspeaker 152. As one task, the controller 175 controls the movement of the acoustic feeder 112. Additionally, the controller 175, based on signals received from the optical sensors 142, controls the subwoofer loudspeaker 152 to generate sound pulses in a timely manner to sort the falling granules based upon identification of their characteristics.

Such an optical sorter 150 sorting the granules 90 one by one is ill-designed to sort large amounts of material. However, since such an optical sorter 150 is so cheap to produce using a 3D printer 10; comprising a few parts that can printed, and two (2) loudspeakers, one (1) 2-channels audio amplifier (or two 1-channel amplifiers), one (1) electronic chip, one (1) 2-channels DAC (digital-to-analog converter) (or two 1-channel DACs), and a few sensors, which are all mass-produced components easily available nowadays, one may simply make a plurality of these optical sorters 150 to increase the material processing capability, thus increasing the amount of material processed per hour at a low cost.

Of course, one using source material that is pure, in powder, or pre-sorted, can skip the steps involving the optical sorters 150, including the displacement of the material using the two (2) infinite screws 132, 134 and the rejection operation. Accordingly, one would just keep the acoustic feeder 112.

Further advantage of the present embodiment of the acoustic feeder 112 is that, in addition to ordering the granules 90 to process them one-by-one, the acoustic feeder 112 regulates the flow into the flexible tube 182 (see FIG. 1) after the optical sorting process. The flexible tube 182 extends from the acoustic feeder 112 to the moving head, a.k.a. printer block 200 of the 3D printer 10, leading the granules 90 therethrough. The connecting flexible tube 182 is further driven to vibrate to prevent granules 90 from getting stuck when the hot end is positioned in such a way that part of the flexible tube 182 is close to a horizontal position. The vibration of the flexible tube 182 participates in a controlled flow of granules 90 therethrough.

Figure 4:
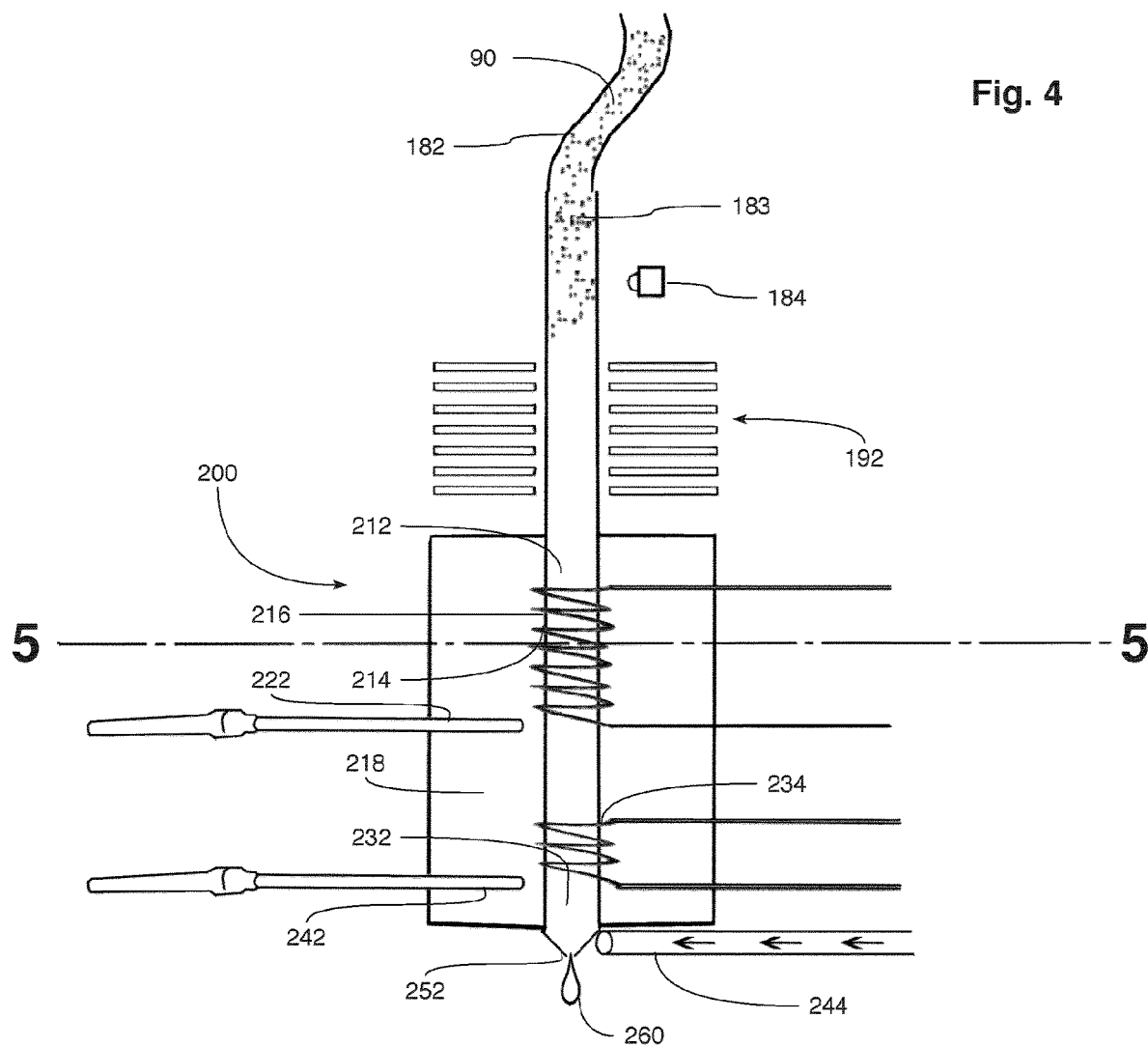
FIG. 4 is a schematic side cut view of the printer block of the 3D printer according to an embodiment.

Referring additionally to FIG. 4, at the top of the printer block 200 is the flexible tube 182 feeding a transparent tube 183 with the granules 90, with an optical sensor 184 measuring the level of granules 90 in the transparent tube 183. The optical sensor 184 is responsible for commands to be sent to the acoustic feeder 112 to keep the level of granules 90 at the desired height in the transparent tube 182. The height of the granules 90 can be arbitrarily increased to increase pressure to the lower parts.

According to an embodiment, to respond to situations when the pressure requirements would result in a required height of granules 90 in the transparent tube 183 that would be unreasonable, or when the granules 90 tend to self-support themselves, and when these issues cannot be fixed by using a transparent tube 183 of a proper diameter, an acoustic hammer (not shown, see hammering controller 522 from FIG. 27 that would control an acoustic hammer as an example of driving means) is placed on top of the transparent tube 183 using a similar part as for the sorting process (see FIGS. 2 and 8) with the diameter of the output hole being about the size of the transparent tube 183.

Figure 12:
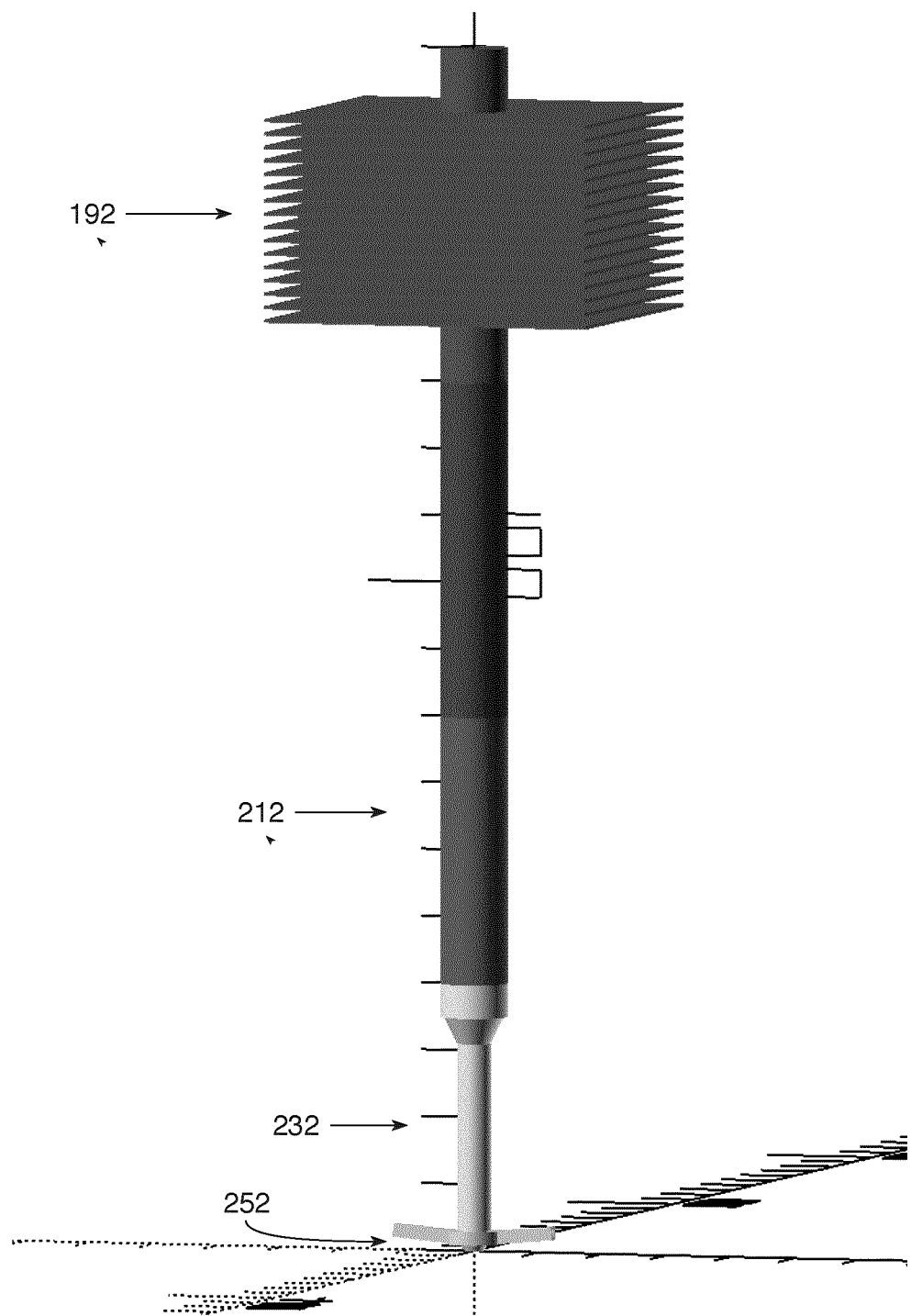
FIG. 12 is a schematic view illustrating the configuration of components of the printer block which are heated or cooled down according to an embodiment.

Referring additionally to FIG. 12, further along the path of the granules 90, the granules 90 enter a radiator 192 that cools off heat generated below as explained after, so the parts above the radiator 192 can work at appropriate temperature.

To 3D print high-quality objects, one challenge resides in controlling the flow of molten printing material. Such control requires the ability to stop the flow of molten printing material on demand, to move the printing head, and then to restart the flow of printing material. Such a level of control with the prior art usually requires pure printing material. The present 3D printer 10 used a liquid/solid printing material solution to overcome these drawbacks.

Figure 5:
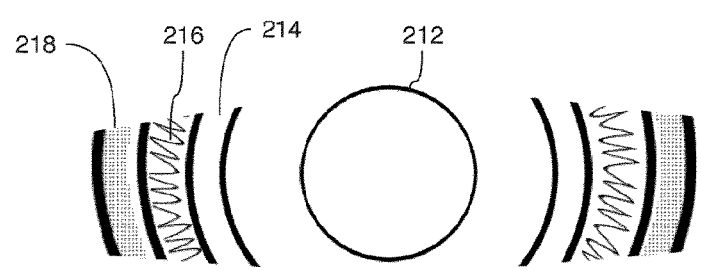
FIG. 5 is a schematic partial cut view of the printer block of FIG. 4.
Figure 11:
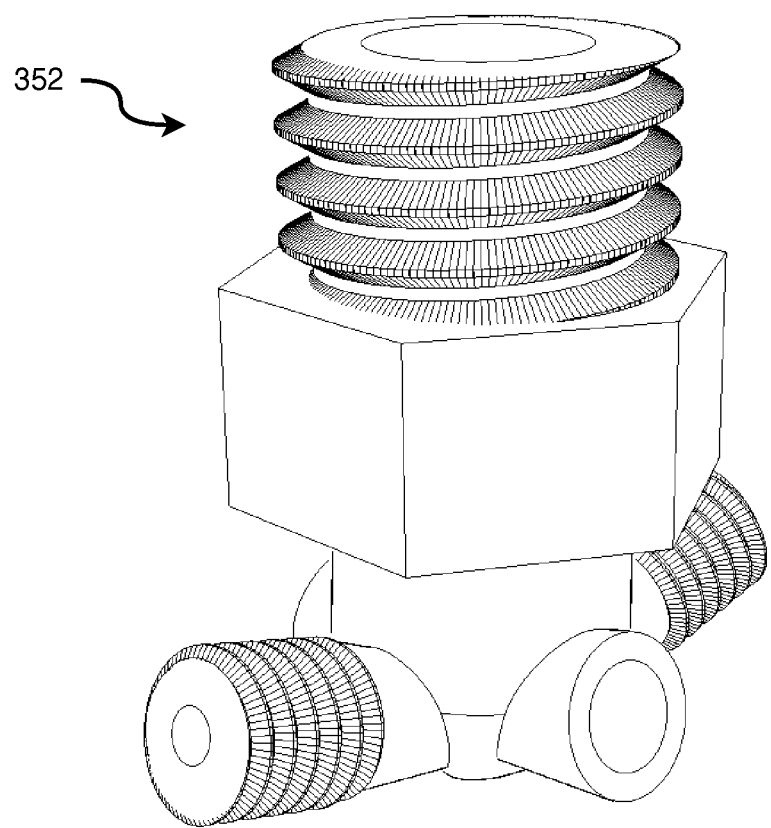
FIG. 11 is perspective view of a nozzle used at the output of the printer block according to an embodiment.

Referring particularly to FIGS. 4 and 5, after the radiator 192, and some extra tubing (not shown) for thermal gradient, the granules 90 enter a cylinder 212 made from a material suitable to operate as a crucible for the material of the granules 90. This cylinder 212, or main micro-kiln 212, is located inside an electrical insulator 214 (e.g., comprising at least one of air, vacuum, quartz, etc.) wrapped with a heating wire 216 (e.g., made of katlan, tungsten, etc.) capable of heating the granules 90 so that they melt at the material-specific temperature. The temperature is measured by a thermal sensor 222, with the whole assembly being kept inside an appropriate thermal insulator 218 (e.g., alumina, fiber glass, etc.). The granules 90, once melted, pour from the main micro-kiln 212 into a smaller second micro-kiln 232 (which comprises its own heater 234 and thermal sensor 242) which has thermal mass that is designed for a desired nozzle output size; i.e., minimized for the desired nozzle output size. That second micro-kiln 232 is equipped with a cooling assembly 244 that can actively cool down (using for instance gas or liquid) the melted material, allowing to solidify the material close to the output nozzle 252, or in other words practically just at the output nozzle 352 of FIG. 11.

According to an embodiment, for a particular range of sizes of the output nozzle 252, i.e., small sizes of output nozzles, an optical pyrometer (not shown) and infrared heating component (not shown) are used instead of the thermocouple and of the heating wire described before with respect to at least the second micro-kiln 232.

For the operation of the 3D printer 10, controlling the flow and viscosity of the molten material 260 in a precise manner is possible through:

varying the amplitude and frequency of the acoustical hammer;
varying quickly the output temperature;
controlling the overall pressure with the granules level; and
controlling the temperature of the main kiln 212.

Hence the flow is precisely controlled which is and improvement over the prior art which usually attempt to obtain the same result by moving the filament. The flow of material can be approximated by the present characteristics of the sound waves sent to the acoustic feed required to keep the current desired granules height level, as the flow of a given material for a specific sound wave shape, volume, and frequency, can be measured in advance.

By reducing the temperature of the output while slightly continuously moving the printer block 200, the operator of the 3D printer 10 can detach a filament of molten material 260 from the 3D printed object and move the printer block 200 to a next position with no stringing, oozing, or other issues that occur typically with most prior art 3D printers, even when they are properly tuned with retraction settings meant to avoid these issues.

Figure 13:
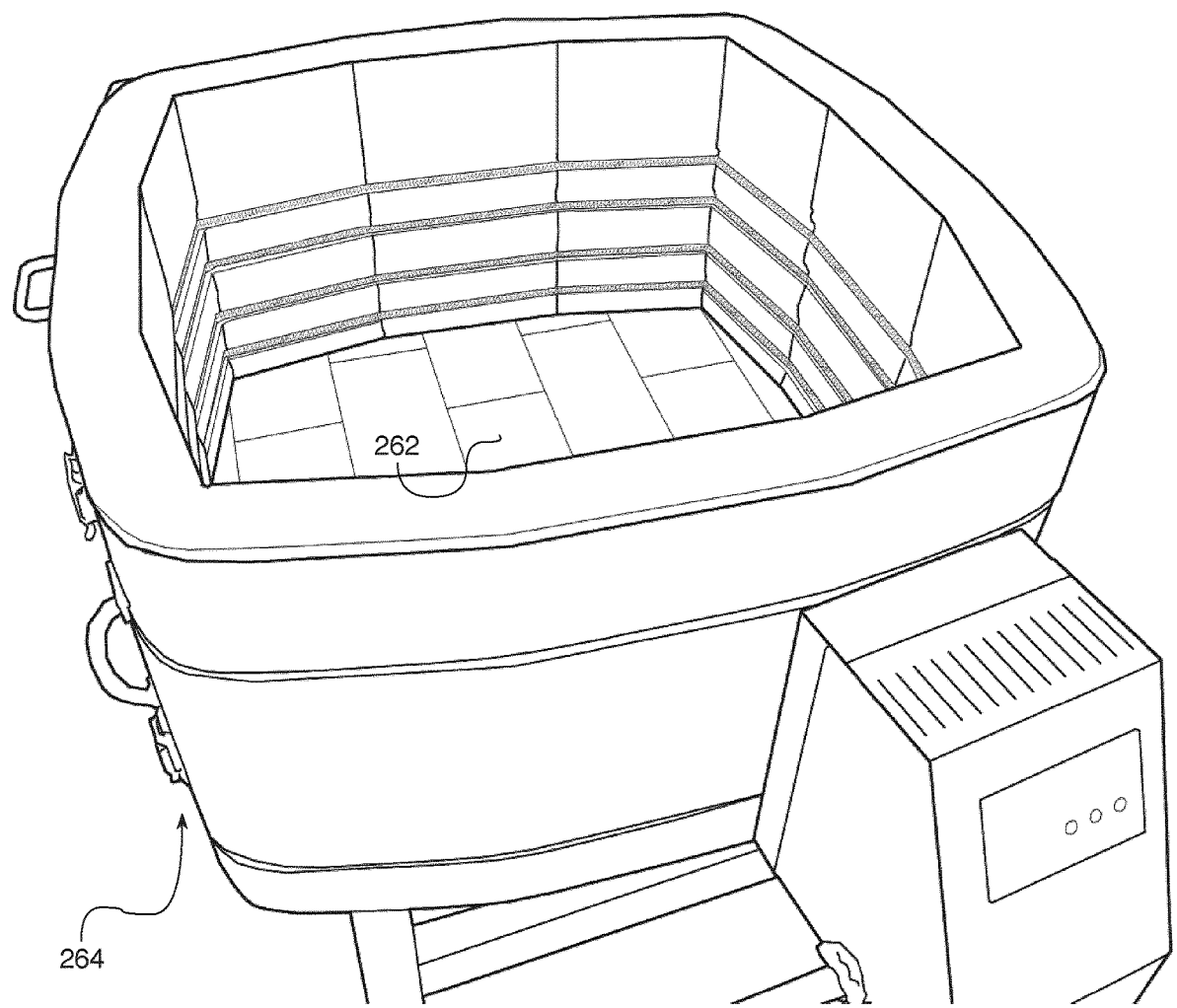
FIG. 13 is a perspective view of a heated chamber according to an embodiment.

Afterwards, as shown in FIG. 1 and additionally in FIG. 13. the molten material 260 is deposited on a build surface of the kiln assembly 262 (e.g., steel plate, glass, kiln wash, etc.), in a heated chamber 264 (a kiln, heated at a temperature of, for example, 500° C. for glass, 100° C. for ABS, 60° C. for PLA, etc.) that can also serve as a lehr for slowly reducing the temperature of the molten material 260 and the whole printed object.

According to an embodiment, the top part of the 3D printer 10 can be moved above another heated chamber (not shown) once a first object is 3D printed, to print another object, while the completed printed object slowly cools down. This two-chamber solution contributes to optimize throughput.

Figure 3:
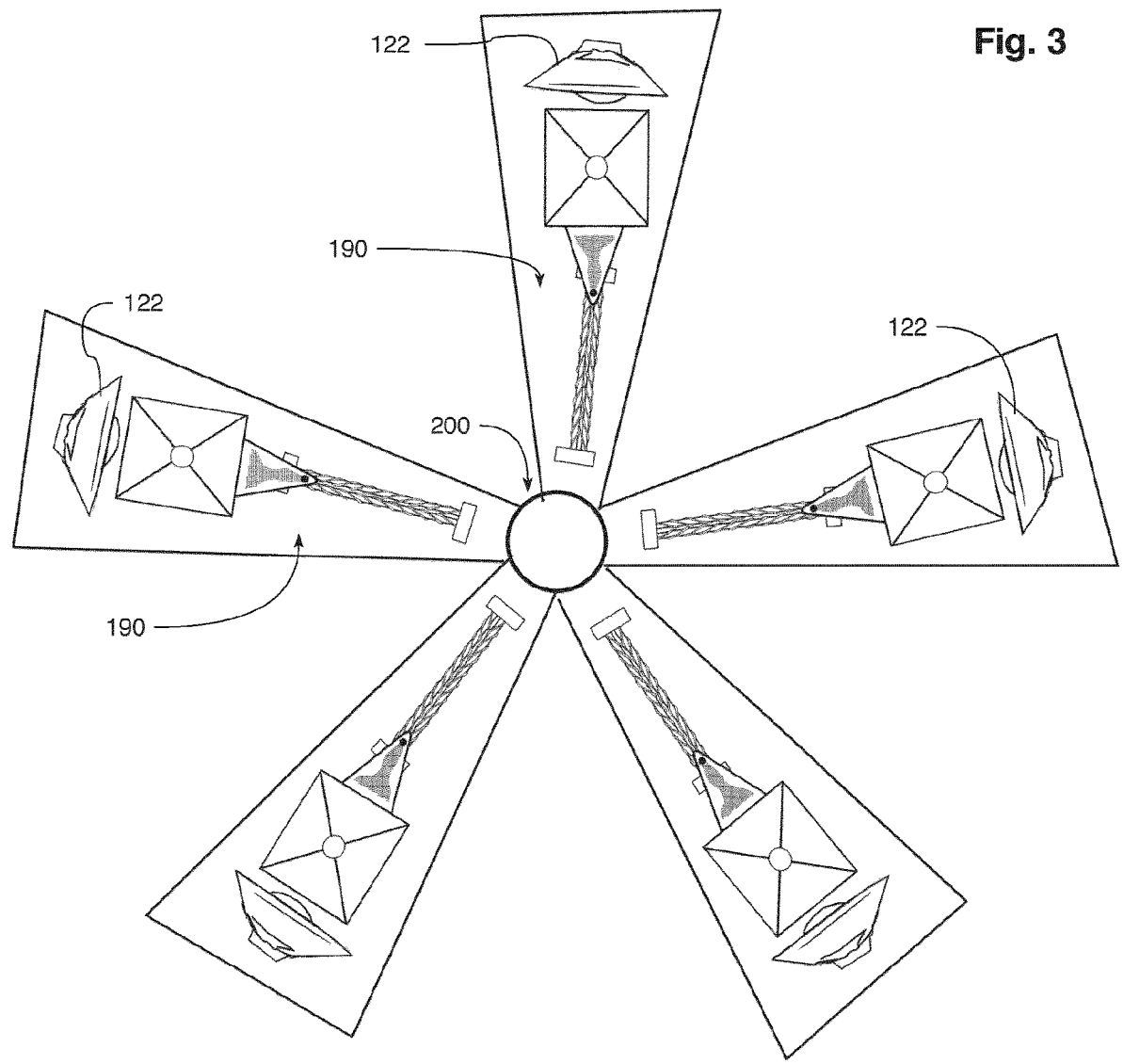
FIG. 3 is schematic top view of the components involved in the feeding of the printer block with granules according to an embodiment.

Now referring to FIG. 3 there is shown a plurality of feeder blocks 12 around a single printer block 200. The foregoing description provides the path of a given granule 90. According to other embodiments, multiple printing materials can each have their own acoustic feeder 112 that pours into the flexible tube 182 toward the printer block 200, providing a method of, for example, mixing colors, incorporating additives in the mix, etc. FIG. 3 illustrates a series of individual paths 190 in a star-like shape, comprising each an acoustic feeder 112 and other previously described components, enabling an embodiment in which a plurality of printing materials are fed individually and mixed before reaching the printer block 200.

By using dual extruders (not shown), the 3D printer 10 can be operated with a variety of different materials, such as glass and aluminum.

The present design can further work with granules 90 or powder material as described, with the use of powder instead of granules 90 requiring minimal changes to the design of the 3D printer 10.

The 3D printer 10, using such a variety of printing materials as discussed before, allows potentially to 3D print motors and circuit boards for the price of the raw material in granules and the operating energy.

Figure 9:
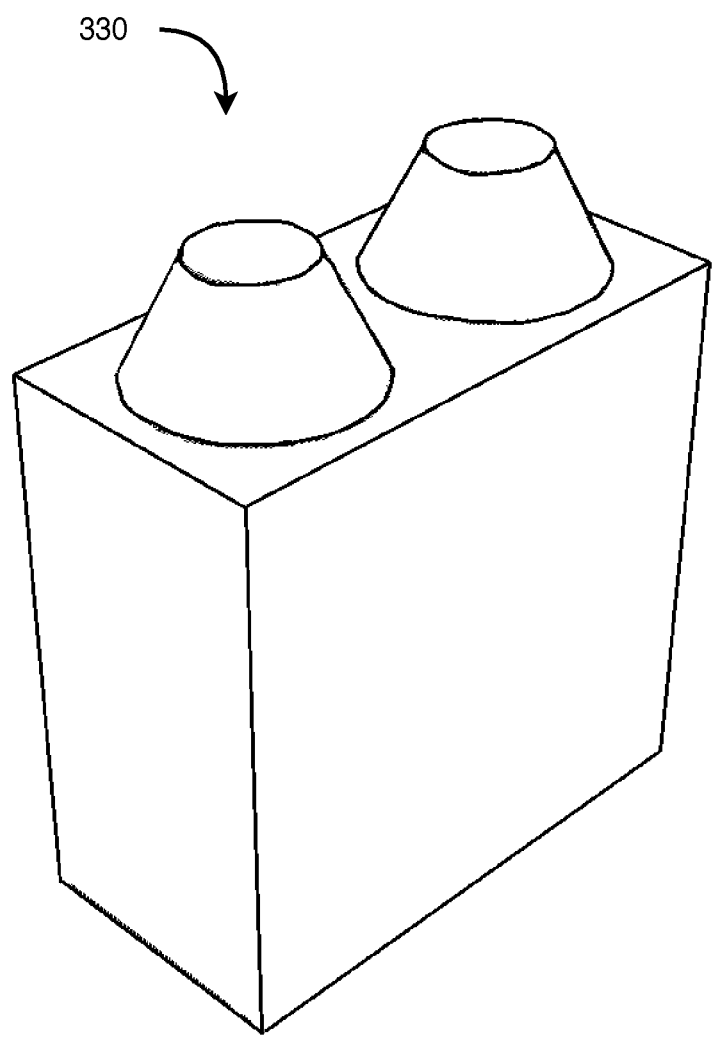
FIG. 9 is perspective view of an insulating brick according to an embodiment.
Figure 14:
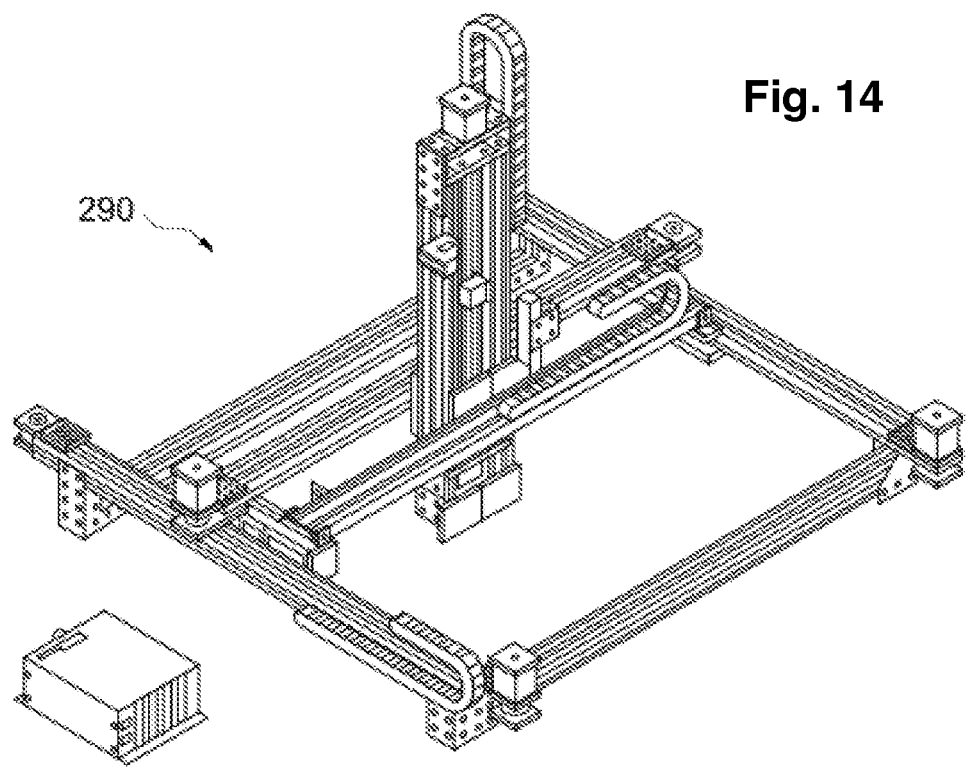
FIG. 14 is a perspective view of a Computer Numerical Control (CNC) machine according to an embodiment.

According to an embodiment, the 3D printer 10 can be bootstrapped to an external Computer Numerical Control (CNC) machine 290 (see FIGS. 1 and 14) and a kiln assembly 262, the 3D printer 10 can print components of its own kiln assembly 262 and the frame of the CNC machine 290. Indeed, using glass, the operator of the 3D printer 10 can print an insulating brick 330 (see FIG. 9) based on a custom design. Since for glass material, the kiln assembly 262 needs to resist to a temperature of about 500° C. (while the glass material is printed at about 1000° C.), it is possible for the 3D printer 10 to print the insulating bricks 330 making a kiln assembly 262 enclosing a similar brick as the one being printed. Likewise, many parts of the rest of the 3D printer 10 can be 3D printed by the 3D printer 10. As discussed before, RepRap™ printers (http://reprap.org) use this principle, with the limitation of printing only plastic parts. Since stiffness of printed plastic parts is relatively low, that characteristic limits severely the components and thus the proportion of the RepRap™ printer that can be 3D printed on the same printer or a similar one. In comparison, stiffness of the glass is substantially higher, hence usable to print more robust parts, including gears (which will have to be adjusted for that material in comparison to metal).

According to another embodiment of a 3D printer, with at least parts depicted on FIGS. 15 to 26, alternatives to the insulating bricks 330 may comprise bricks comprising at least a layer of foam or made of foam material manufactured with the 3D printer.

Figure 10:
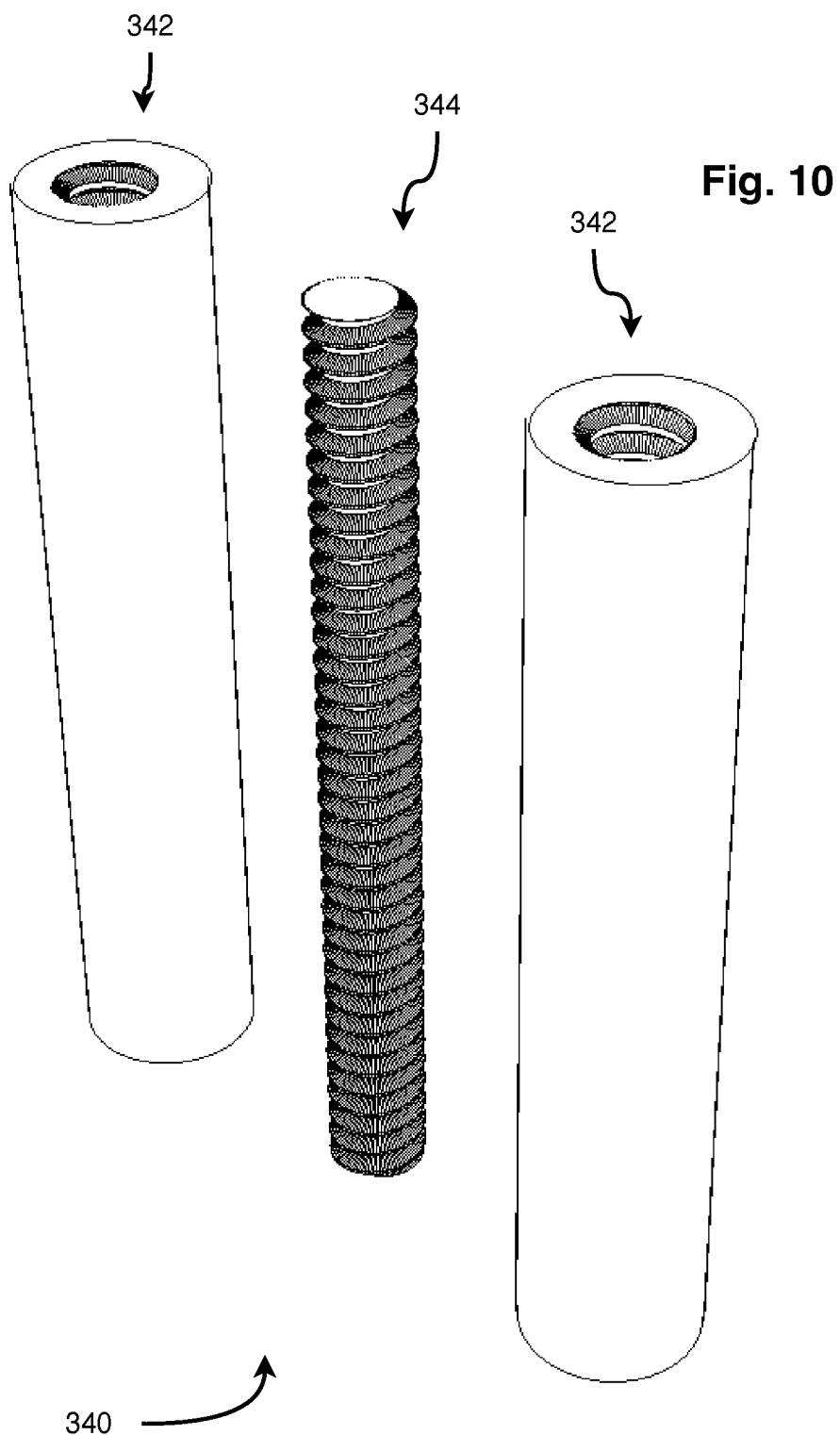
FIG. 10 is a perspective view of a rod assembly according to an embodiment.

Referring to FIG. 10, the present 3D printer 10 also allows to print rods 340 that can potentially be larger than the maximum build volume of the 3D printer 10; such by printing a plurality of smaller rods 342, one or more connecting piece(s) 344, and screwing the printed rods 342 and the connecting piece(s) 344 together as an assemblage (not shown). Such adaptations are available for a variety of parts, including actual frame parts.

Alternatively, other configurations may be used such as tubes (e.g., square tubes and cylindrical tubes) that may comprise for example insert portions to join. The joint can be fixed to each other using glue, being weld or using alternative methods known in the art.

Finally, the present design of a 3D printer 10 is well adapted or requires small adaptations for harsh environments where procurement is difficult, expensive or almost impossible.

For instance, the 3D printer 10 can be adapted to 3D print objects using Martian regolith (with potentially the use of additives to lower the melting point of the Martian regolith). Accordingly, one such 3D printer could be shipped on Mars, with the capability of being operated to replicate itself for maintenance, for production improvements or specific operations. It may further be used to gradually increase the production capabilities and the size of the printed objects. The design of the present 3D printer 10 can thus be optimized to minimize the mass of the printer components that cannot in current conditions be 3D printed with the current 3D printer 10.

This particular feature is, of course, still very useful here on Earth. The operator of a 3D printer 10 can use regular sand when recycled glass is too complex to obtain, for instance in countries lacking the appropriate infrastructures allowing easy procurement of recycled glass.

Electronics components that cannot in current conditions be 3D printed are lightweight and are available at low costs nowadays. The remaining parts that cannot in current conditions be 3D printed are the motors, which are the remaining costly and/or heavy parts that need to be bought instead of printing them. Therefore, such a 3D printer would be widely accessible for everyone wishing to own one at a reasonable price. Further, the process of building it, maintaining it and operating it in terms of printing material would also be accessible to a wide proportion of the population.

Figure 15:
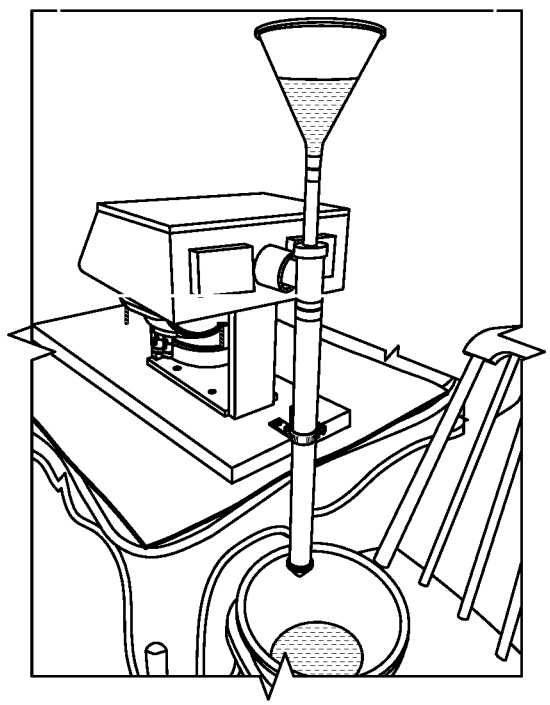
FIGS. 15 and 16 are perspective views of part of 3D printer in accordance with another embodiment.
Figure 16:
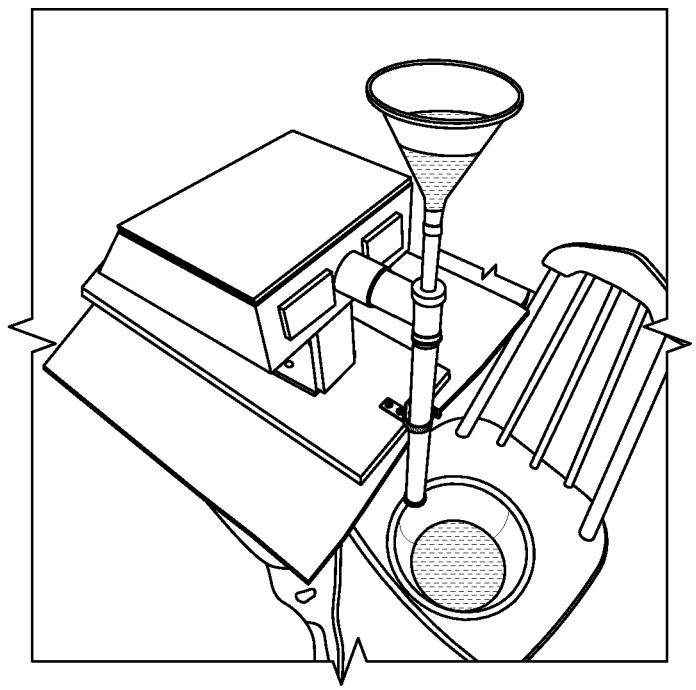
Figure 17:
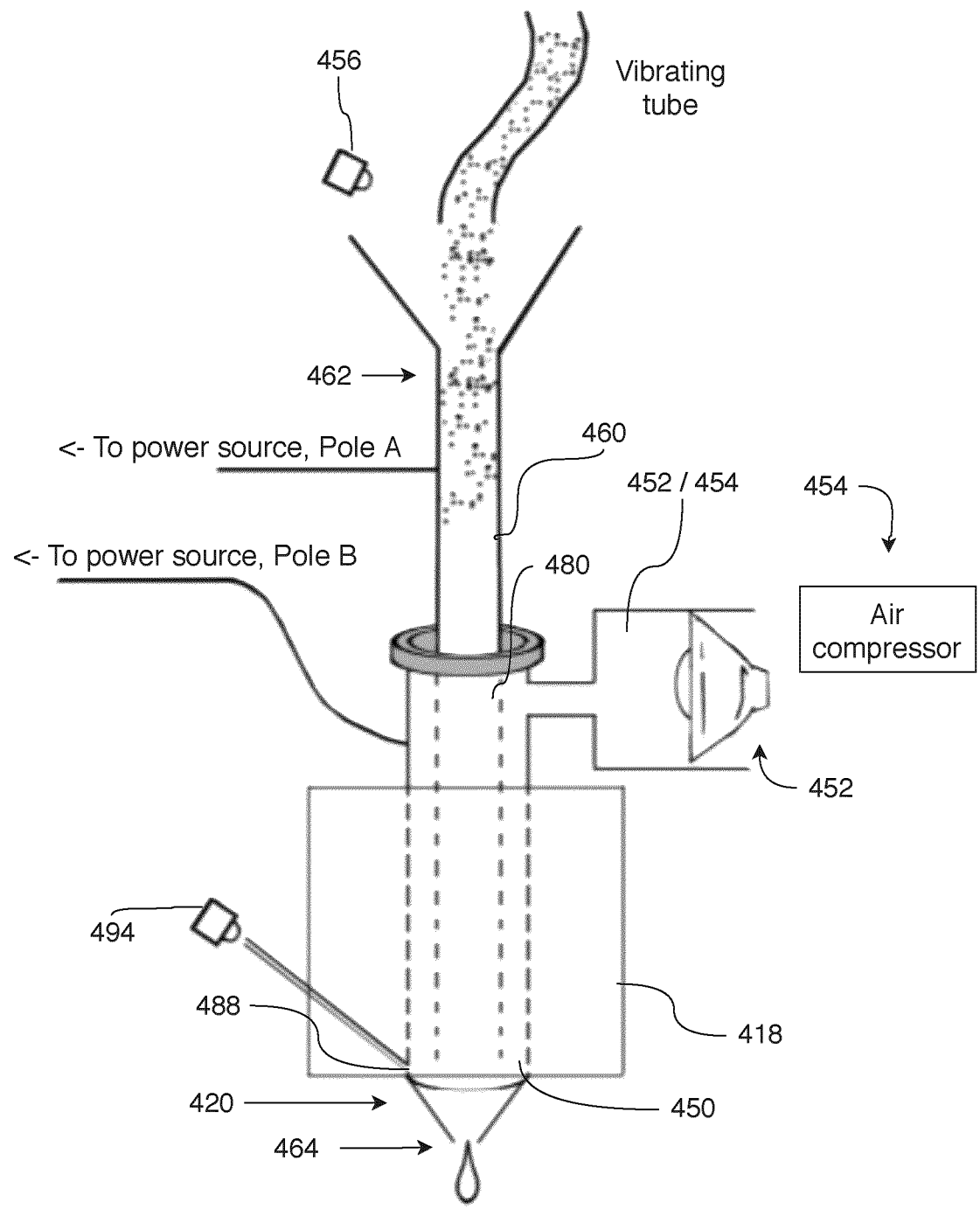
FIG. 17 is a schematic of a 3D printer in accordance with an embodiment.

Referring now to FIGS. 15 to 17, parts of another embodiment of a 3D printer is illustrated. The 3D printer comprises an alternative feeding, heating and deposition assembly comprising a feeding tube 450 (i.e., a material feeding conduit, depicted on FIG. 19) comprising an inner tube 460 fed at the top extremity 462 with granules 90 and connected to a material delivery device 420, which may sometimes be referred to as a crucible, at the bottom extremity 464. The feeding tube 450 further comprises an outer tube 480 also connected to the material delivery device 420 at its bottom extremity 464. It is to be noted that the material delivery device 420 can be interpreted to comprise a crucible portion and a nozzle portion as described herein.

Other components such as thermal insulator 418 (similar to thermal insulator 218), and granule feeding components up flow from the feeding tube 450 comprising an optical sensor 456 monitoring flow of material (similar to optical sensor 184, part of feeding sensors 512) remain similar as with the 3D printer 10.

Regarding the thermal insulator 418, a variety of material may be used for that part, with the selection of the material as the dimensions of the thermal insulator 418 being based on the operating temperature of the 3D printer. Examples of materials for the thermal insulator 418 comprise plaster, concrete and castable alumina. Further alternative materials are listed at https://www.zircarceramics.com/product/alumina-castable-type-ziralcast-94/.

Referring additionally to FIGS. 21 to 25, the material delivery device 420 is made of, or at least comprises, electrical and thermal conductive material, e.g., stainless steel or for very high temperature platinum. The material delivery device 420 is adapted to perform a plurality of functions typically performed by separated components in known 3D printers. The material delivery device 420 operates as a nozzle for depositing material and as a heating element for changing the phase of the granules 90 from a solid state into a liquid state. The material delivery device 420 has female inner fitting 422 about its top edge 423; the top edge 423 being characterized by an associated perimeter (i.e., a top perimeter), a corresponding circumference and a corresponding flow area. The female inner fitting 422 is adapted for connecting the inner tube 460. The female inner fitting 422 operates as a cylindrical contact face with the inner tube 460. The material delivery device 420 is adapted to lead and pour granules 90 to the material delivery device 420 from its bottom edge 425; the bottom edge 425 being characterized by an associated perimeter (i.e. a bottom perimeter which is smaller than the top perimeter), a corresponding circumference and a corresponding flow area. The interface of the inner tube 460 with the material delivery device 420 further operates as an electrical connector, aka electrical contact, used to polarize the inner fitting 422. The material delivery device 420 has female outer fitting 432 for connecting to the outer tube 480; the passage between the inner tube 460 and the outer tube 480 provides fluid communication between inlet 498 and the bottom end of the outer tube 480 for purposes explained hereinbelow. The interface of the outer tube 480 with the material delivery device 420 further operates as an electrical connector, aka electrical contact, used to polarize the outer fitting 432.

One should note that the reference to materials of the material delivery device 420 should include related materials and platinum should include related alloys. Relatively to the use of platinum, one should understand that platinum comprises platinum-based alloys such as platinum-iridium alloys, and platinum-rhodium alloys. It further encompasses other material and allows, wherein the selection of the material or alloy is based on at least its thermal and electrical characteristics. Examples of materials and alloys to select from are provided through https://www.technology.matthey.com/pdf/pmr-v43-i1-018-028.pdf and https://www.technology.matthey.com/article/43/1/18-28/. Other characteristics that may influence the selection comprises the chemical inertia ort lack of reactiveness with other chemical compounds.

The inner tube 460 and the outer tube 480 are joined with the material delivery device 420 using according to a first non-limiting method a pressure conical fitting, or according to a second non-limiting method by friction welding. Alternatively, the tube 450 and the crucible may be made using the same method or as a single component.

The material delivery device 420 comprises an inner funnel 424 extending from the inner fitting 422, and an outer funnel 434 extending in periphery of the inner funnel 424. The inner funnel 424 has a large aperture at its top and a small aperture at its bottom. The additive material therefore flows (i.e., is guided) from the large aperture to the small aperture.

The outer funnel 434 ends at its bottom (small) extremity with an aperture 438 (i.e., the small aperture of the outer funnel 434) operating as a delivery nozzle for material deposition, aka liquid resulting from melted granules 90. A junction wall 440 joins and at least partially divides the inner funnel 424 to the outer funnel 434. Thus, the interior space 435 in the inner funnel 424 is at least partially concealed from the exterior space 445; a space enclosed by the outer funnel 434.

According to an embodiment, the junction wall 440 features slits 442 that are sized to obstruct flow of molten material from within the enclosure defined by the junction wall 440 toward to outer funnel 434, wherein the outward flow is prevented by the viscosity of the molten material, but wherein the size of the slits 442 allows air movement to be directly coupled to the molten enclosed in the junction wall 440. Thus, the slits 442 provide openings through which fluid communication is provided between the interior space and the exterior of the inner funnel 424 above the connection of the inner funnel 424 with the outer funnel 434.

According to an embodiment, no slits 442 are present in a realization where the influence of air pressure on the molten material is unnecessary and/or when structural and thermal characteristics for the material delivery device 420 are the utmost important characteristics to obtain and/or when the presence of slits 442 would work against these desired characteristics for the material delivery device 420 or the desired operating conditions.

Thermal characteristics of the material delivery device 420 depend on the material(s) composing the material delivery device 420 and on design parameters, e.g., diameter, thickness, length, etc., of the material delivery device 420 since the crucible heats based on electricity travelling between the polarized inner fitting 422 and the polarized outer funnel 434.

In the depicted realization, the material delivery device 420 is designed in such a manner that the portion with highest electrical resistance, i.e., the biggest voltage drop/power output, is near the portion operating as a delivery nozzle, near the aperture 438. That characteristic is due to the electrical resistance increasing with the decrease of the diameter, in other words the bigger the circular diameter of the funnel/cone diameter, the smaller the electrical resistance. Further, the higher the electrical resistance, the higher the heat generated and thus the temperature of the corresponding surface or portion. So, it results that, with the depicted material delivery device 420, most heat is generated near the bottom, and the portion connecting both funnels 424, 434, namely the junction wall 440, has the greatest resistance, heat most where the most needed.

Practically, the resistance profile of the material delivery device 420, thus the heating profile of the material delivery device 420, can be adjusted by varying sizes and thicknesses to generate increase or decrease electrical resistance where it is needed.

According to an embodiment, a plating solution may be used to modify electrical resistance on desired surfaces.

Figure 21:
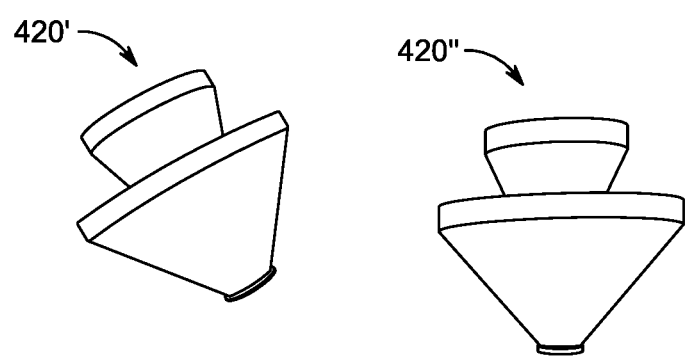
FIG. 21 is a picture depicting two crucibles in accordance with embodiments of the 3D printer.
Figure 22:
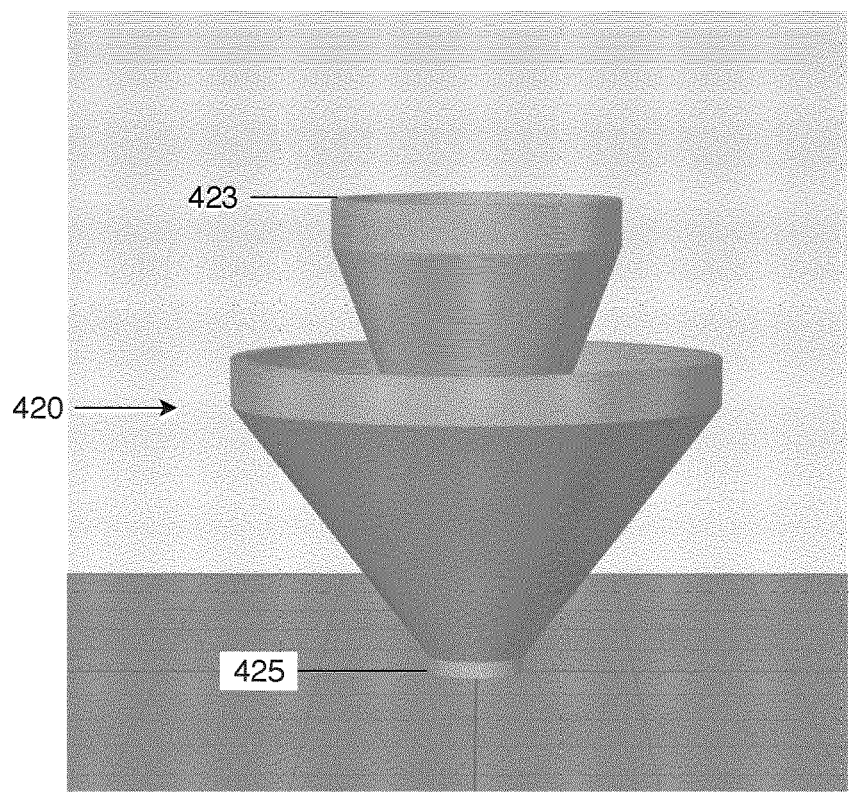
FIG. 22 is a side view of a crucible in accordance with an embodiment.
Figure 23:
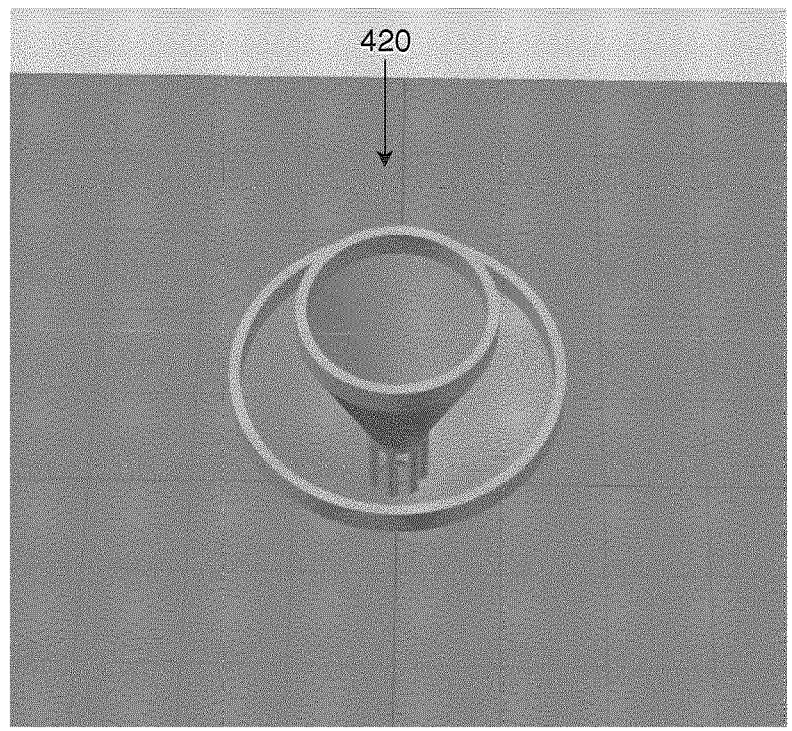
FIG. 23 is an elevation view of the crucible of FIG. 22.
Figure 24:
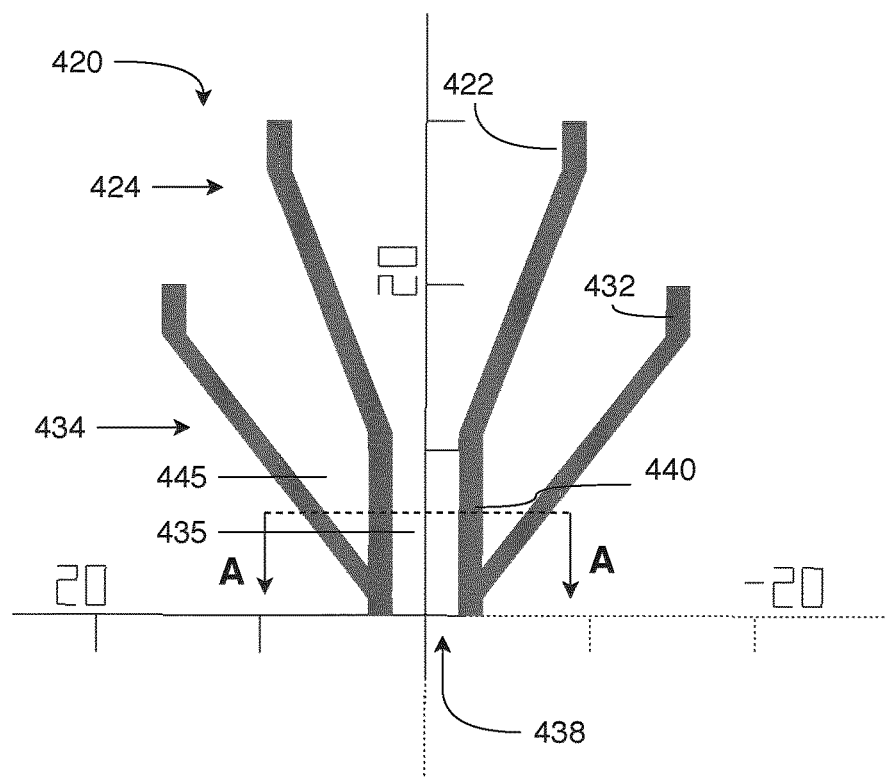
FIG. 24 is a side sectional view of the crucible of FIGS. 22 and 23 according to a vertical plan passing through a central axis of the crucible.
Figure 25:
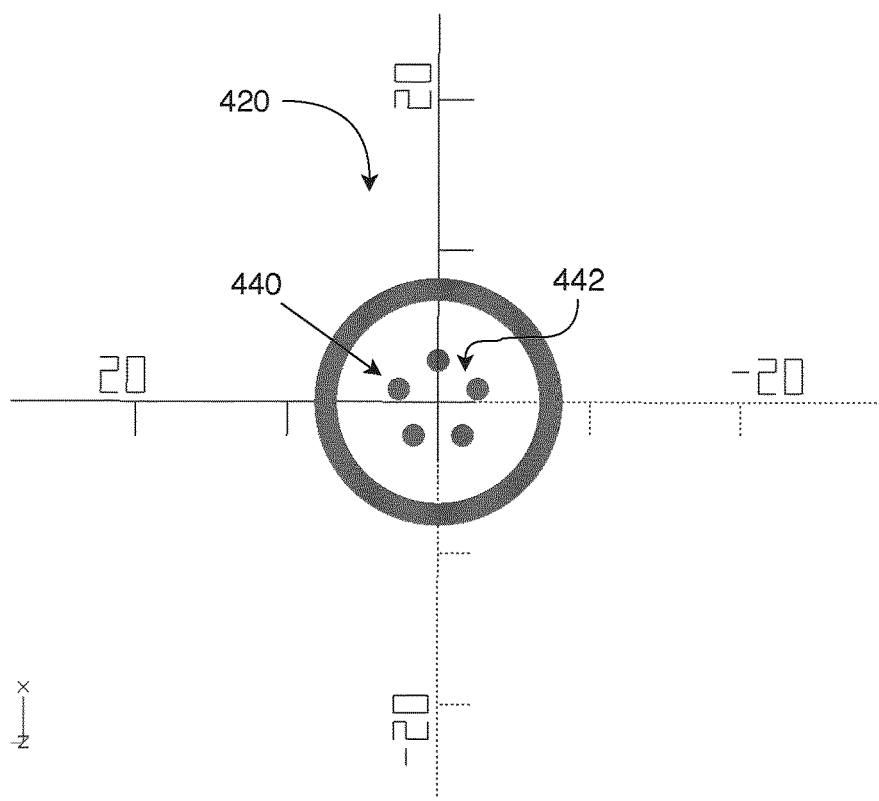
FIG. 25 is a top sectional view along cutting line A-A of the crucible of FIGS. 22 to 24.

Referring now particularly to FIG. 21, the left material delivery device 420' is made of stainless steel. The right material delivery device 420" is made of platinum. The platinum material delivery device 420" features high electric resistivity, thus heats to high temperatures. Accordingly, tubes 460 and 480 are made of platinum on contacting sections to resist to these high temperatures. Above, the materials of the tubes 460 and 480 may be modified through for example sectional tubes joined together as the temperature decrease. For example, a stainless-steel tube portion may be joined to a platinum tube portion farther from the material delivery device 420, and a copper tube portion may be joined even farther.

Figure 20:
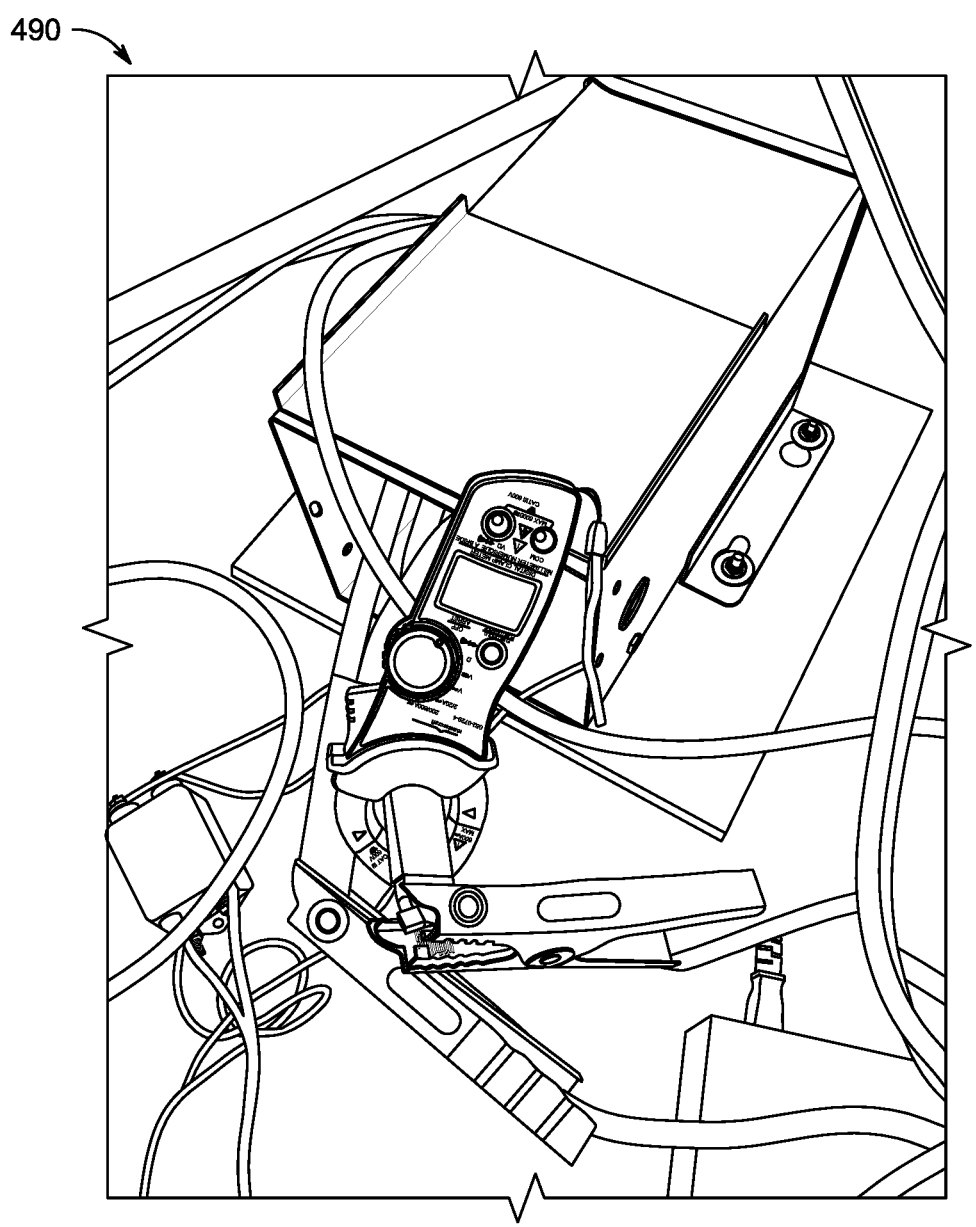
FIG. 20 is a picture of an exemplary power controller adapted for the operation of an embodiment of a 3D printer.

Referring additionally to FIG. 20, the tubes 460 and 480 are connected to a transformer 490 able to provide high current/low voltage/high power necessary for the current circulating in the material delivery device 420 to heat to the temperature needed. According to realizations, the reached temperature is up to about two thousand (~2000) degrees Celsius for a material delivery device 420 made of platinum and about nine hundred (~900) degrees Celsius for a material delivery device 420 made of stainless steel. Since the heat/temperature drops with the diameter, as explained above, only the small exit diameter will reach that peak temperature. Further, the material delivery device 420 may be designed with diameters for the fittings 422, 432 that are big enough for the temperature at the fittings 422, 432 to be low enough for refractory material (e.g. plaster/alumina) to be used to hold the tubes 460, 480 to the material delivery device 420.

Figure 27:
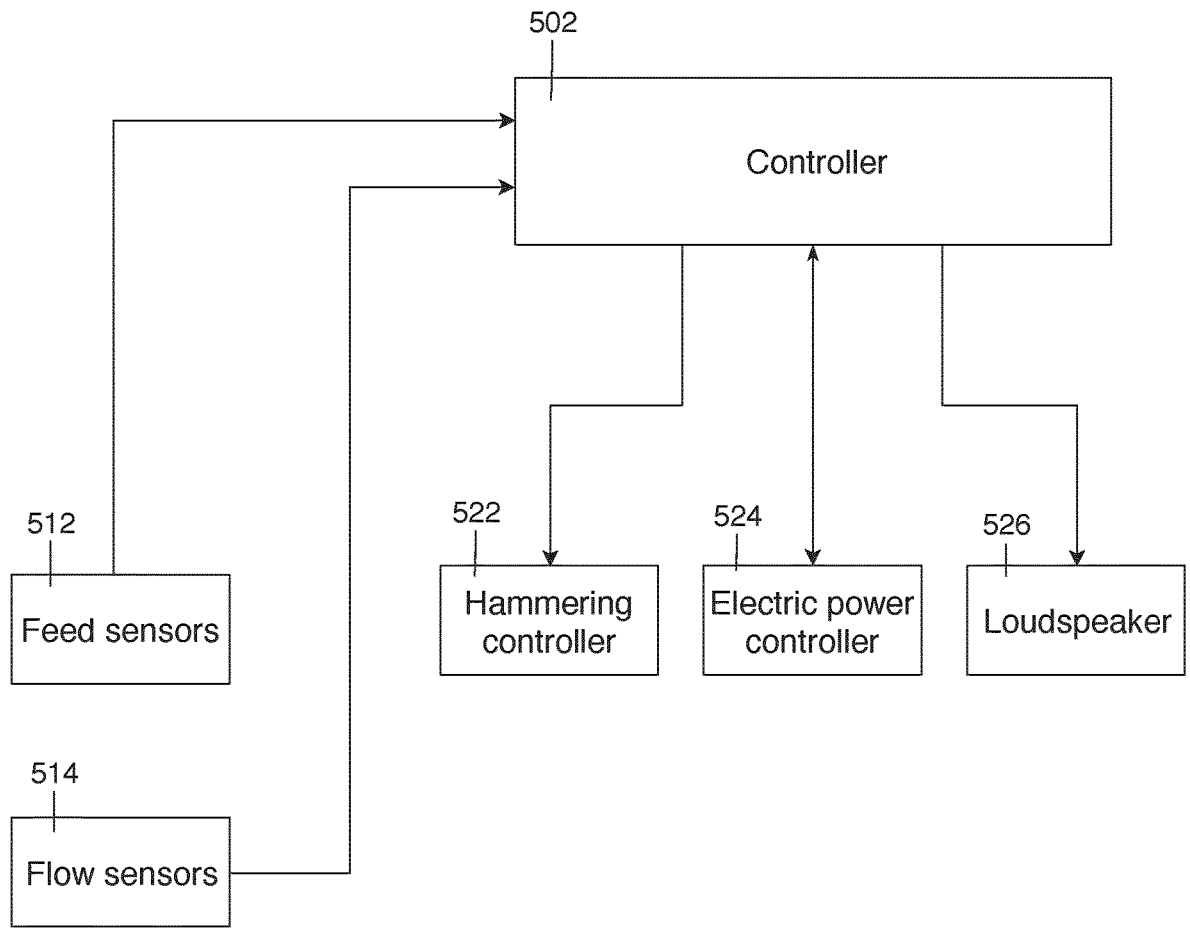
FIG. 27 is a schematic of controlling components of an embodiment of a 3D printer.

Referring now additionally to FIG. 27, since the electric power source is of a known voltage, a current sensor (flow sensor 514) can be used to measure the resistivity of the material delivery device 420 which doubles as a temperature measurement since the electrical resistance of the material delivery device 420 changes with temperature. Accordingly, the electrical power controller 524 and the flow sensor 514 define a feedback temperature control system.

Figure 26:
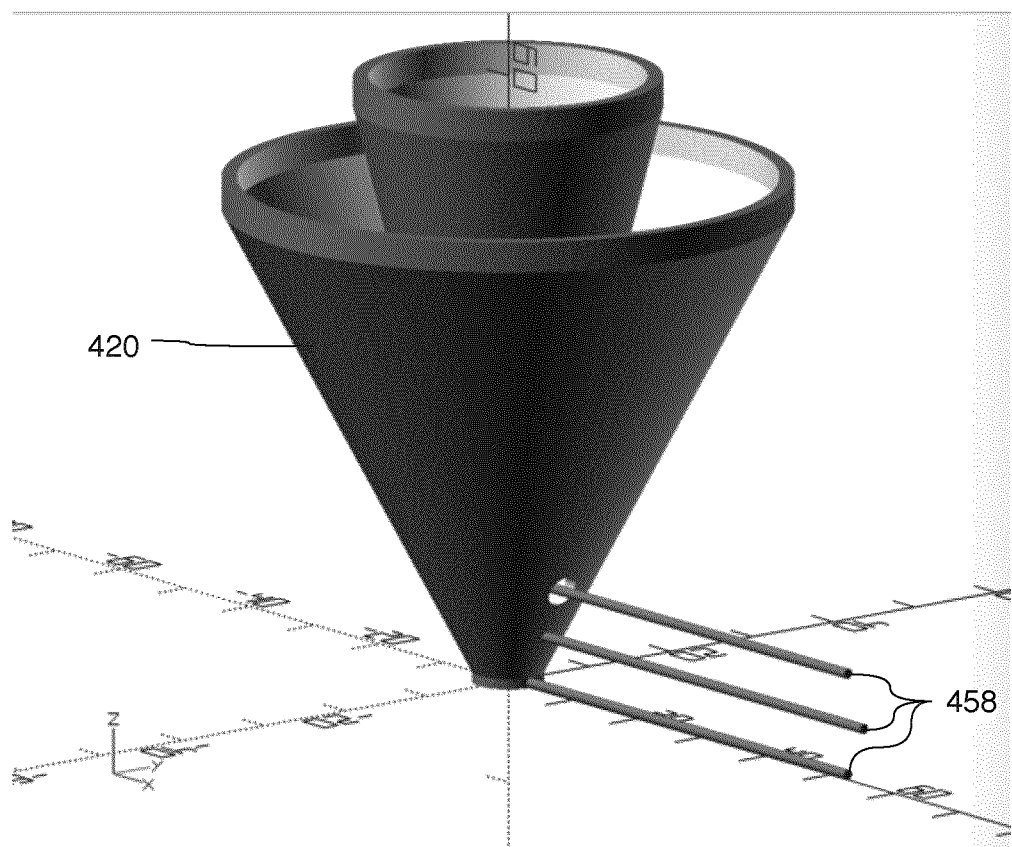
FIG. 26 is an elevation view of an embodiment of a crucible with sensing wires.

Referring to FIG. 26, a contemplated solution to measure the temperature of the material delivery device 420 comprises a Kelvin sensing (see reference https://en.wikipedia.org/wiki/Four-terminal_sensing) using a plurality of wires 458 contacting the material delivery device 420 at one extremity and plugged in a sensor (not shown) at the other extremity to sense changes in electrical characteristics of the material delivery device 420 as the temperature of the crucible changes, and thus to deduct the current temperature of the material delivery device 420. As above, a signal is transmitted to the electrical power controller 524 to perform live control of the temperature of the material delivery device 420.

The entire material delivery device 420 can be, for example, connected as part of an assembly comprising a line noise filter connected to a relay, the latter connected to a current transformer, with the latter connected to the material delivery device 420. One can use a controller 502 to perform duty cycles to vary the average heating power. An alternative sophisticated approach would have to have multiple relays using a multi-tap current transformer to allow multiple heating levels, or a servo-controlled variac in front of the current transformer.

The present solution solves multiple major issues occurring with previous 3D printers comprising heating wires. Such previous solutions do not allow to operate according to similar temperature limits as the present material delivery device 420. Further the use of heating wires results in a delay between the wires being powered and the metal being heated due to in-between components. Such a delay practically complicates the manufacturing process about and at the delivery nozzle.

One should note that, according to the 3D printer operating with the material delivery device 420, the use of a heat sink or radiator (similar to radiator 192), a cooling assembly (similar to cooling assembly 244), and heating wires (similar to heating wire 216 and heater 234) are either optional of completely prevented since the granules 90 are heated when in the material delivery device 420.

According to the depicted realization, the outer tube 480 has a small hole 488 that allows the passage from the outside of a sensor wire ending about the nozzle output between the two inner funnel 424 and the outer funnel 434. Accordingly, an optical sensor 494 or a pyrometer, and in case of low temperature operation a thermocouple or thermistor (with any of these being in the category of flow sensors 514, FIG. 27) can sense the nozzle output, and thus, directly measure its temperature.

Figure 19:
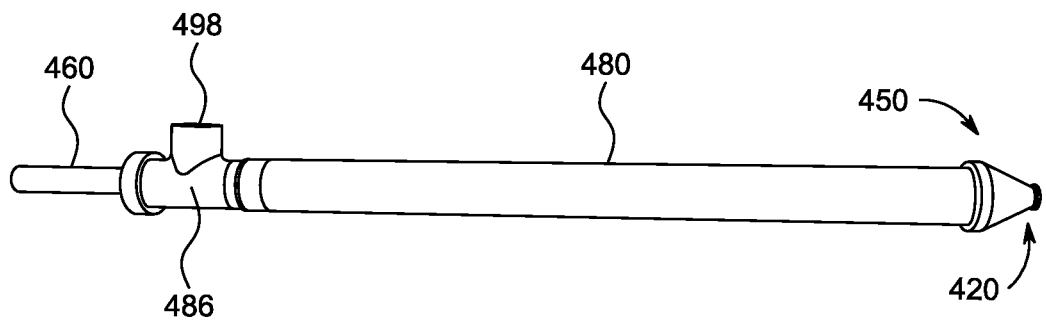
FIG. 19 is a picture of a tube comprising an inner tube and an outer tube in accordance with an embodiment.

Referring now particularly to FIGS. 17 and 19, the outer tube 480 comprises about its top extremity a T fitting 486, for a gas/air flow driving means to be paired through the side connection to provide power and help with the control of the flow.

According to the depicted realization, the T fitting 486 provides a seal between the inner tube 460 and the outer tube 480. Accordingly, power provided by the driving means, (i.e. flow-driving means), which is thus fluidly connected to the material delivery device 420 at the extremity of the feeding tube 450, travels through that space to reach the material delivery device 420. According to a realization, the seal may be made of plastic, ceramic, plaster, or glass, with the selection of the material used for the seal being based at least on the temperature that reach the seal when in operation, thus based on the characteristics of the molten material.

According to a realization, a subwoofer loudspeaker 452, aka loudspeaker 526 from FIG. 27, is paired to the assembly. According to another realization, an air compressor 454 is connected to the inlet 498. According to realizations, driving means influencing flow of material 90 in the material delivery device 420 may comprise an arrangement comprising a subwoofer loudspeaker 452 or an acoustic hammer.

The subwoofer loudspeaker 452 performs three different functions:

1-Creating a temporary vacuum in the outer tube 480 and thus about the slits 442. Where a typical 3D printer would retract the filament to create a vacuum to immediately stop the flow of material, application of negative Direct Current (DC) voltage to the subwoofer loudspeaker 452 creates a temporary vacuum combined with a temperature drop that participate in temporarily stopping the flow of molten material at the delivery nozzle;

2-Accelerating the restauration of flow of molten material at the delivery nozzle. inversely, when the temperature is increased to restart the flow, application of positive DC voltage to the subwoofer loudspeaker 452 creates an overpressure that kickstarts the extrusion process.

3-Temperature stabilization. By using acoustic waves instead of other options, the subwoofer loudspeaker 452 avoids providing a temperature inhibiting the flow of material and thus keeps the temperature stable, thus practically close to the point where capillary effect balances internal pressure/viscosity of the molten material. The acoustic waves can be used to control the flow by going slightly over and under the threshold where the capillary effect holds the molten material Using an air compressor 454 as a flow-driving means involves high pressure air or another gas. With such a configuration, one can make the delivery nozzle spray the molten material in a way that creates foam or another type of materials wherein the molten material and the gas are mixed in the outcome material.

One should note that the 3D printer will be able to operate not only with glass, but with sugar, salt, plastic, even metal.

The size of the delivery nozzle (aperture 438) will be designed for a specific viscosity range of a material. For materials that have a broad viscosity range (i.e. glass), a broad range of sizes of delivery nozzles can be used since temperature can be adjusted. For materials with a narrower viscosity range (e.g. water, metal), the possible nozzle size will be decided based on the capillary effect, therefore having very delivery nozzles that have a very small diameter with low viscosity materials. The material delivery device 420', made of platinum, can operate in high temperatures quite above the temperature requires to operate with the glass, comprising with quartz, sand, and regolith (e.g. lunar regolith, Martian regolith or Earth regolith). The material delivery device 420", made of stainless steel, is less expensive to produce and allows to operate with almost anything requiring operating temperatures under the molting glass temperature.

According to a realization, a material delivery device 420 comprises an inner funnel 424 adapted at its top to be joined to a feeding tube similar to inner tube 460 feeding the material delivery device 420 with granules 90, wherein the material delivery device 420 comprises at its top an electrical contact (similar to interface of the inner tube 460). The material delivery device 420 comprises at its bottom an aperture similar to aperture 438 operating as a nozzle for the deposition of material, and a rim (similar to outer funnel 434 but rather without the conic shape) extending outwardly from the crucible. The rim comprises distant to the inner funnel 424 a periphery about which is defined a second electrical contact (similar to interface of the outer funnel 434). Accordingly, the material delivery device 420 is powered through current provided through both electrical contacts and, wherein the electrical contacts being located far from small-diameter portions of the inner funnel 424 have their temperature increased less than the small-diameter portions of the inner funnel 424 through the travelling of current therethrough.

One should further note that operation of the present 3D printers may be involved in plans for extra-terrestrial 3d printed habitations that focus mainly on extruding concrete/cement which might not be easy to make on another planet, or requite a lot of material to be brought there (at a very high cost), while our solution do not require any additives and can 3d print directly with whatever available. This also allows for integrating larger 3d printed blocks of quartz or sand or other material into architectural buildings.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A material delivery device for an additive manufacturing device (AMD) adapted for manufacturing objects through deposition of additive material over a build surface, the material delivery device comprising:
   an inner funnel having a large aperture at a top edge and a small aperture at a bottom edge whereby the additive material is guided from the large aperture to the small aperture;
   an outer funnel located external to the inner funnel, the outer funnel having a large aperture at a top edge and a small aperture extending outwardly from the bottom edge of the inner funnel, wherein the outer funnel and the inner funnel are joined about the small aperture of the inner funnel and the small aperture of the outer funnel;

a first electrical contact located about the top edge of the inner funnel; and a second electrical contact located about the top edge of the outer funnel;

wherein the inner funnel is electrically conductive and, upon applying an electrical current from an electric power source between the first electrical contact and the second electrical contact, heat is generated thereby heating the additive material travelling in the inner funnel.

2. The material delivery device of claim 1, further comprising a junction wall extending about the small aperture of the inner funnel, whereby the junction wall joins the outer funnel to the inner funnel.

3. The material delivery device of claim 2, wherein the junction wall divides an interior space concealed by the inner funnel and an exterior space within the outer funnel, wherein the wall comprises openings through which the exterior space is in fluid communication with the interior space.

4. The material delivery device of claim 1, wherein the material delivery device is made at least in part of one of a metallic material or a metallic alloy.

5. The material delivery device of claim 1, wherein the material delivery device is made at least in part of one of platinum and a platinum-based alloy.

6. The material delivery device of claim 1, wherein the inner funnel has a varying thickness which results in a variation of an electrical resistance of the inner funnel and hence a variation of the heat which is generated.

* * * * *